Oct. 27, 1964 F. L. GERIN 3,153,927

VISCOSITY GAUGING DEVICES

Filed Feb. 21, 1962 13 Sheets-Sheet 1

INVENTOR.
FERNAND L. GERIN
BY
Moses, Nolte, Crews & Berry
ATTORNEYS

Oct. 27, 1964 F. L. GERIN 3,153,927

VISCOSITY GAUGING DEVICES

Filed Feb. 21, 1962 13 Sheets-Sheet 2

INVENTOR.

FERNAND L. GERIN

BY

Mosher, Holte, Crews & Berry

ATTORNEYS

INVENTOR.
FERNAND L. GERIN
BY
Moses, Nolte, Crews & Berry
ATTORNEYS

Fig. 9
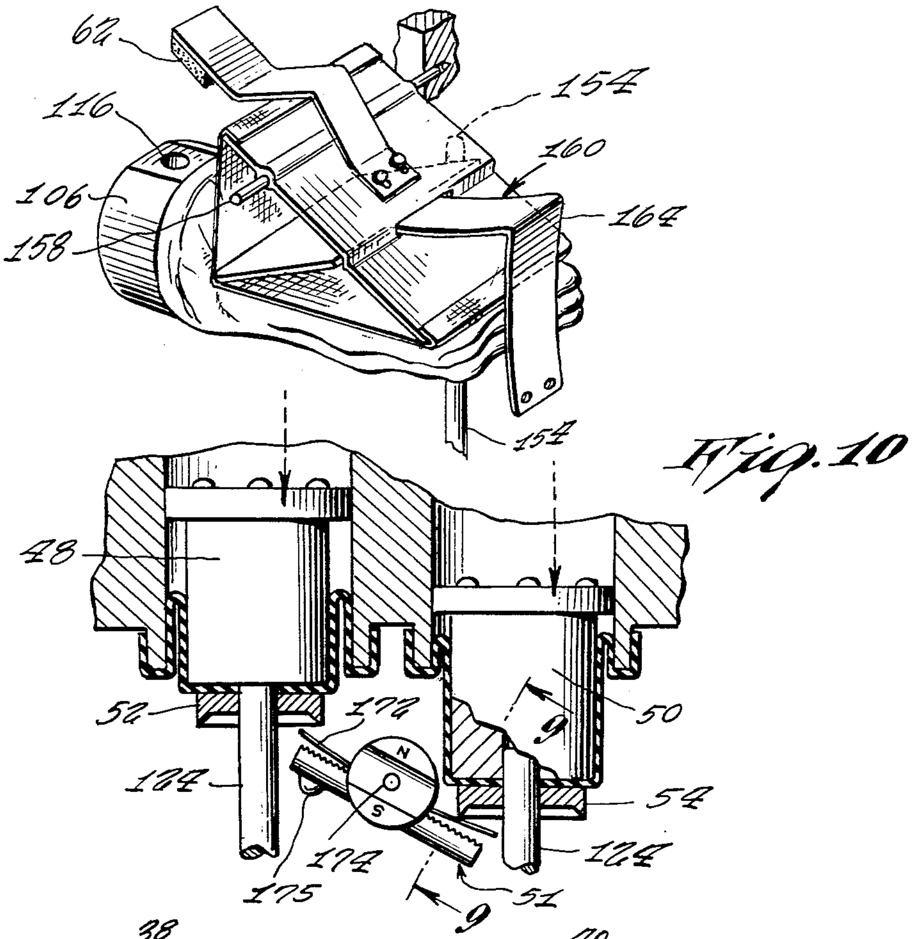
Fig. 10
Fig. 11
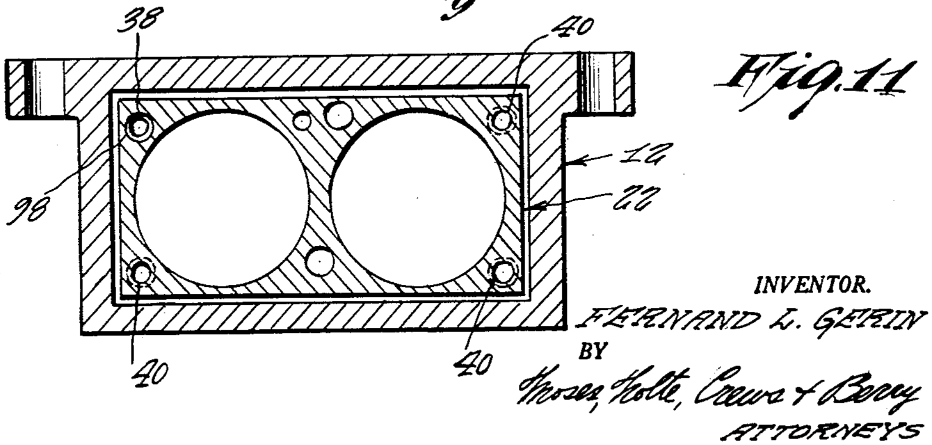
INVENTOR.
FERNAND L. GERIN
BY
Moses, Holte, Coeur & Berry
ATTORNEYS Oct. 27, 1964 F. L. GERIN 3,153,927
VISCOSITY GAUGING DEVICES
Filed Feb. 21, 1962 13 Sheets-Sheet 5
Fig. 12
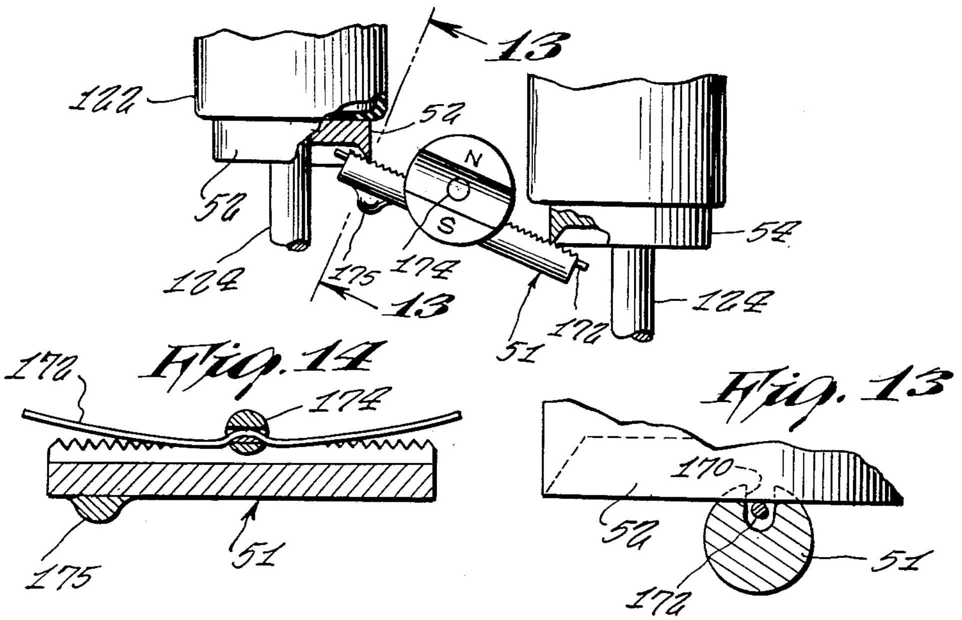
Fig. 14, Fig. 13
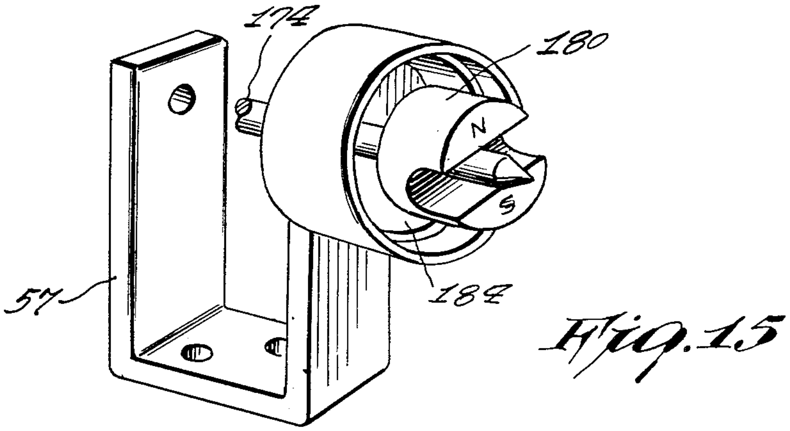
Fig. 15
INVENTOR.
FERNAND L. GERIN
BY
Moses, Nolte, Crews & Berry
ATTORNEYS INVENTOR.
FERNAND L. GERIN
BY
Moses, Nolte, Crews & Berry
ATTORNEYS INVENTOR.
FERNAND L. GERIN
BY
Moses, Nolte, & Nolte
ATTORNEYS INVENTOR.
FERNAND L. GERIN
BY
Moses, Nolte, & Nolte
ATTORNEYS Oct. 27, 1964 F. L. GERIN 3,153,927

VISCOSITY GAUGING DEVICES

Filed Feb. 21, 1962 13 Sheets-Sheet 9

INVENTOR.
FERNAND L. GERIN
BY
Moses, Nolte, & Nolte
ATTORNEYS

VISCOSITY GAUGING DEVICES

Filed Feb. 21, 1962 13 Sheets-Sheet 10

INVENTOR.
FERNAND L. GERIN
BY
Moses, Nolte, & Nolte
ATTORNEYS

INVENTOR.
FERNAND L. GERIN
BY
Moses, Nolte, & Nolte
ATTORNEYS

Oct. 27, 1964 F. L. GERIN 3,153,927

VISCOSITY GAUGING DEVICES

Filed Feb. 21, 1962 13 Sheets-Sheet 12

INVENTOR
FERNAND L. GERIN
BY
Moses, Nolte, & Nolte
ATTORNEYS

INVENTOR
FERNAND L. GERIN
BY
Moses, Nolte, & Nolte
ATTORNEYS 3,153,927
Patented Oct. 27, 1964

3,153,927

VISCOSITY GAUGING DEVICES

Fernand L. Gerin, Navesink River Road, Locust, N.J.

Filed Feb. 21, 1962, Ser. No. 176,856
49 Claims. (Cl. 73—56)

The present invention relates to viscosity gauges, and more particularly to instruments of this character which provide a comparative reading between a test specimen and a standard specimen under identical temperature conditions.

This application is a continuation-in-part of applicant's prior copending applications, Serial No. 547,077, filed November 16, 1955, now abandoned, and Serial No. 10,507, filed February 23, 1960, now abandoned.

Although readily applicable to other uses, the viscosity gauge of the present invention is particularly adapted for indicating changes in composition of the lubricating oil which have occurred during use in an internal combustion engine. Dilution of lubricating oil by the leakage of fuel into the lubricating system impairs the fitness of the oil for use, causes an increased rate of wear, and, unless such a condition is corrected before the dilution becomes too great, causes serious damage to the engine through improper lubrication. Dilution by fuel is reflected in a lowering of the viscosity of the oil.

The leaking of cooling water into the lubrication system will also impair the lubricating quality of the oil and render it unfit for use, with considerable danger of damage to the internal combustion engine arising from inadequate and improper lubrication. The water which leaks in becomes churned into the oil, emulsifying it. This condition is reflected in an increased viscosity of the oil.

The present invention is concerned with a gauge adaptable for connection to a fluid pressure line and includes operating parts positioned in a test initiating position by the circulation, under pressure, of fluid to be tested through the gauge. An instrument of this character finds particular applicability for connection with an operating machine such as an engine to permit the obtaining of a relative viscosity reading between a test sample of lubricating oil and the engine operating oil. An instrument constructed in accordance with this invention provides a means for periodically observing the characteristics of fluids, such as engine oil, in order to determine any malfunctioning of the engine associated with contamination or deterioration of the lubricating oil or improper lubricating conditions of associated apparatus.

Accordingly, it is an object of this invention to provide an improved viscosity indicating gauge.

It is a further object of the invention to provide a viscosity gauge which will provide consistent and accurate readings indicative of changes in the viscosity of the lubricating oil of the internal combustion engine.

It is a further object to provide a viscosity gauge appurtenant to an internal combustion engine that acts automatically upon stopping of the engine to set up a reading indicative of the viscosity of the crank case oil and to maintain that reading so long as the engine remains idle. By this means a service inspector may be informed of the condition of the oil merely by referring to the gauge, and without the necessity of starting and warming up the engine.

It is a further object to provide a viscosity gauge of the kind referred to which will discriminate between changes of viscosity resulting from changes in composition of the oil and those resulting from a mere change of temperature, reflecting the former changes accurately in its indication while ignoring the latter.

To this end it is a feature that provision is made for comparing the oil in use and a standard reference specimen at a common temperature, which temperature is the normal operating temperature of the oil. This is desirable because changes in viscosity tend to produce exaggerated readings if the comparison is made at room temperature or out-door temperature rather than the higher temperature attained during engine operation. The results of tests made at operating temperature reflect more reliably the changes in the ability of the oil to lubricate the engine.

It is a feature that the indicating means is housed separately from the oil responsive actuating means therefor, being connected through a magnetic coupling for operation by such actuating means.

A further object of the invention is to provide a viscosity indicating gauge which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Other objects and advantages will hereinafter appear.

In the drawings forming part of this specification:

FIG. 9 is a fragmentary isometric detail view of the reference specimen oil sac and associated parts, the sac being shown in squeezed condition;

FIG. 10 is a fragmentary sectional view showing the viscosity comparing pistons and lever in the positions occupied by them near the end of a viscosity measurement of a very dilute engine oil;

FIG. 11 is a horizontal sectional view taken on the line 11—11 of FIG. 1 looking in the direction of the arrows;

FIG. 12 is a fragmentary view generally similar to FIG. 10 but less comprehensive than FIG. 10 and on a larger scale, showing the parts at the conclusion of the measuring operation which is illustrated at an incomplete stage in FIG. 10;

FIG. 13 is a fragmentary sectional view on the line 13—13 of FIG. 12, looking in the direction of the arrows, the view being on a larger scale than FIG. 12;

FIG. 14 is a detailed sectional view of the viscosity meauring balancing lever and immediately associated parts;

FIG. 15 is an isometric view of the drive magnet for the indicator and associated parts;

Figures 17, 25, 26D:
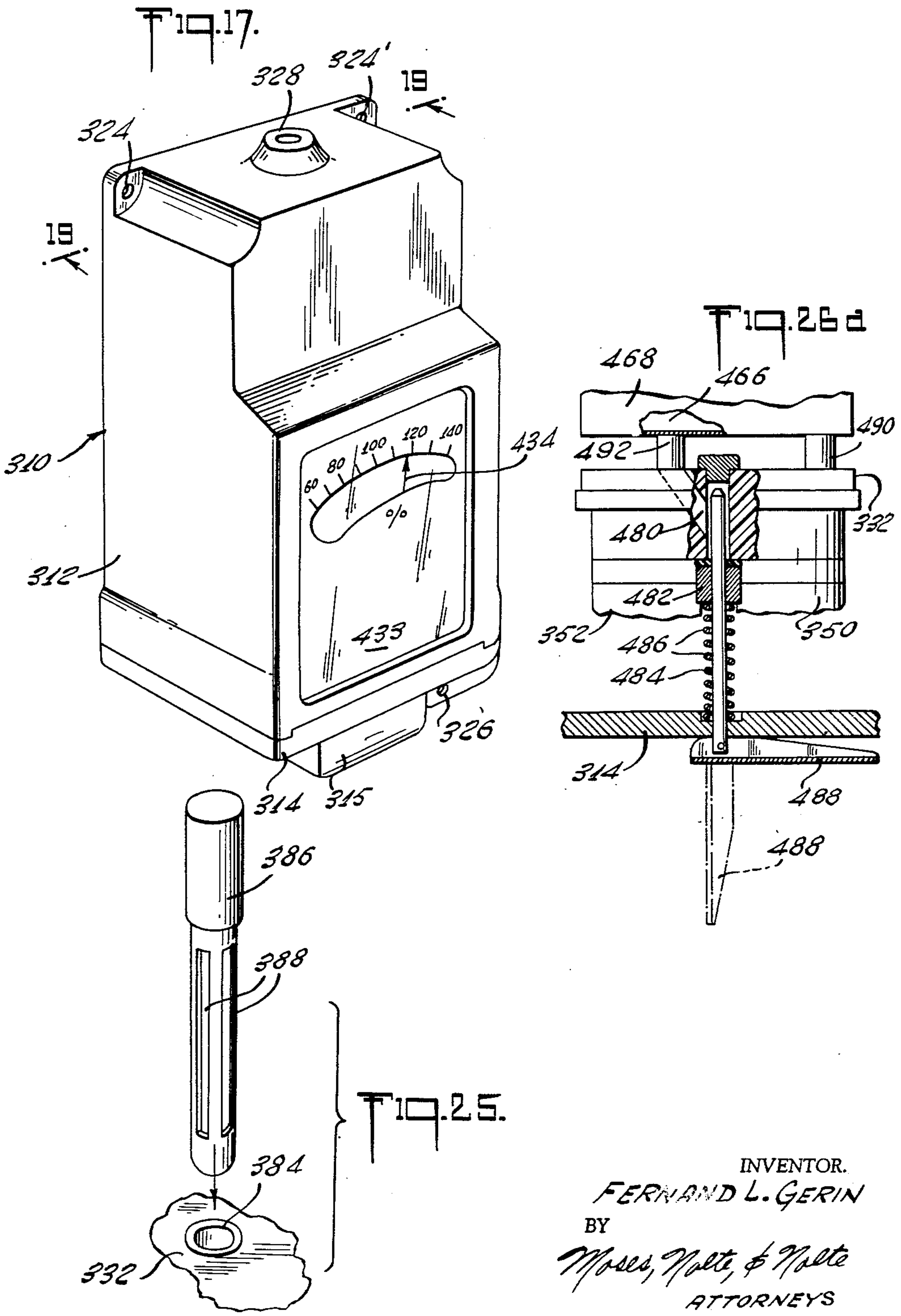
FIG. 17 is a perspective view of another embodiment of a viscosity indicating gauge constructed in accordance with the invention.
FIG. 25 is an exploded perspective view showing the details of construction of the piston pressure regulating valve.
Figure 18:
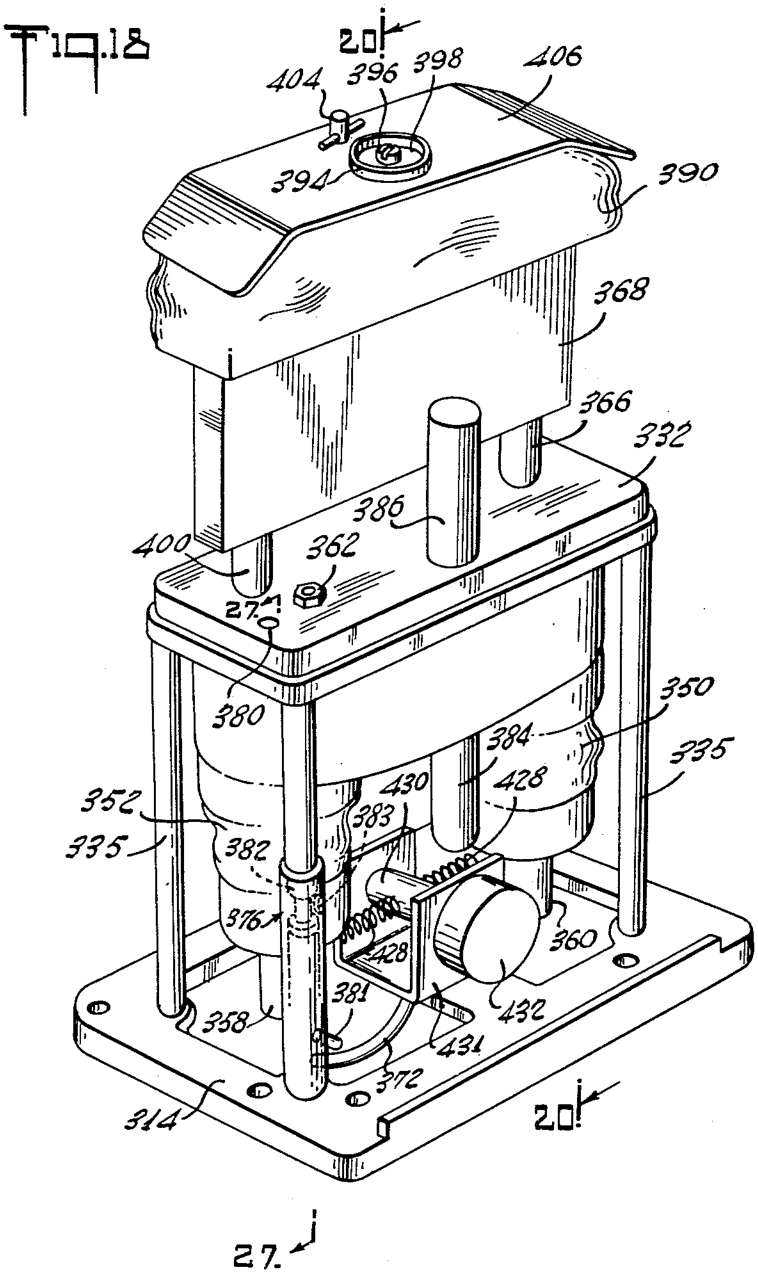
FIG. 18 is a perspective view of the viscosity gauge shown in FIG. 17 but with the outside cover removed.
Figure 26:
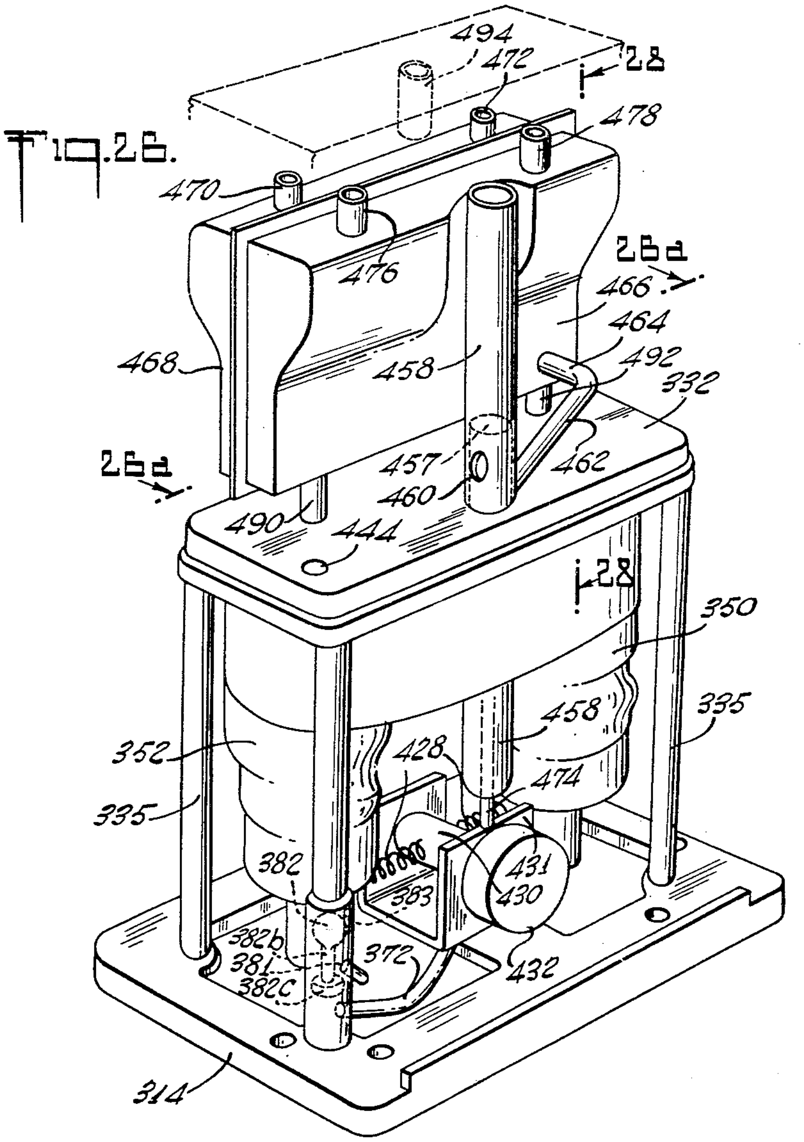
FIG. 26 is a perspective view of the front portion of another embodiment of viscosity indicating gauge constructed in accordance with the invention.
Figures 27, 28, 29:
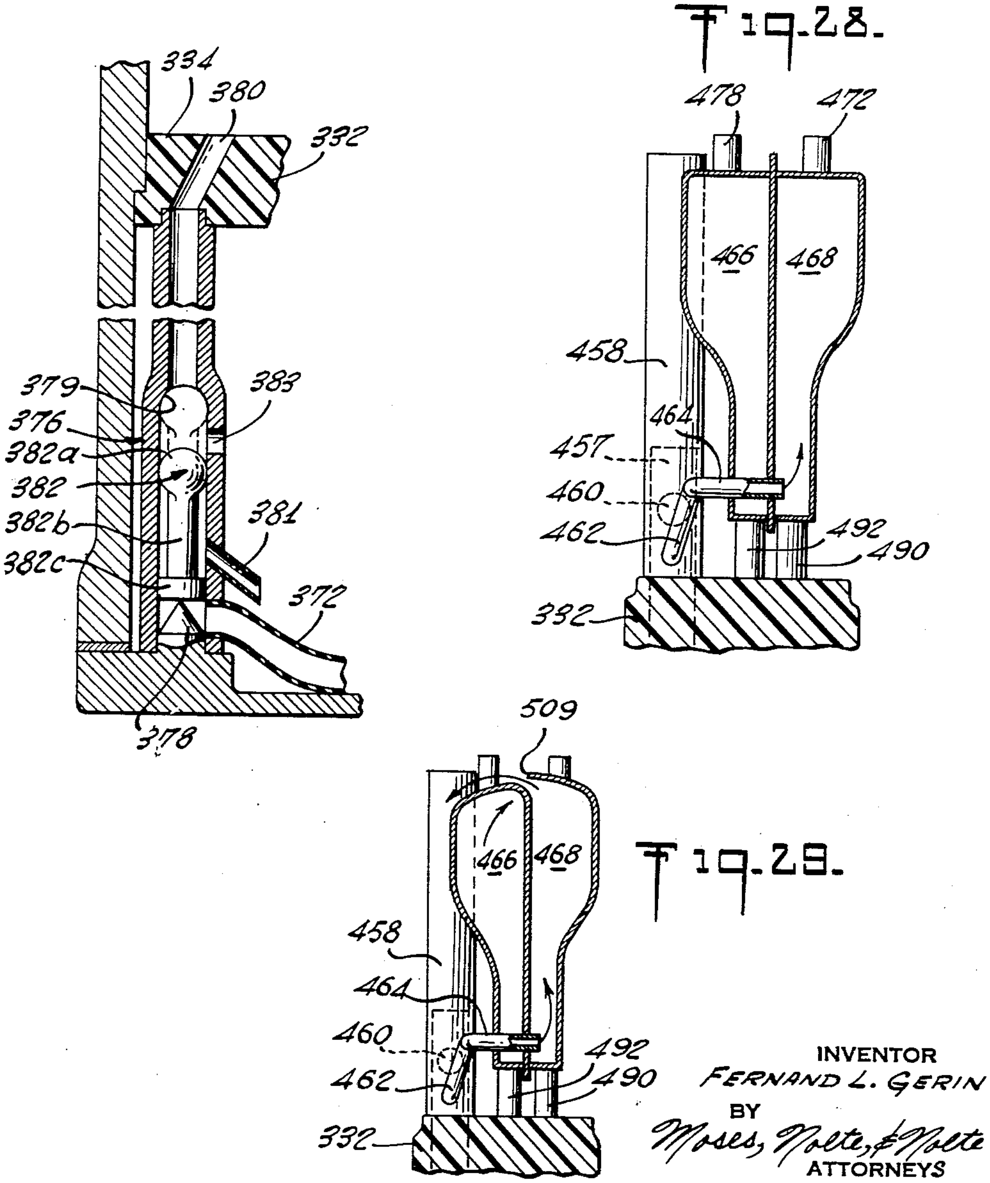

FIG. 26*a* is a partial sectional view taken along line **26*a*—26*a*** of FIG. 26;

FIG. 27 is a fragmentary vertical section taken on the line 27—27 of FIG. 18;

FIG. 28 is a fragmentary vertical section taken on the line 28—28 of FIG. 26; and FIG. 29 is a fragmentary vertical section through the standard and test fluid tanks of another embodiment of the invention.

In order that the nature and principle of operation of the invention may be clearly understood, the illustrative embodiment of FIGS. 1 to 15 will be first comprehensively explained by reference to the principal parts, and without reference to detail.

The instrument 10 comprises an outer casing 12 of non-corrosive, non-ferrous metal, desirably aluminum or an aluminum alloy, which is designed to be externally applied to the casing of an internal combustion engine, and which is connected to the oil pump and to the sump of the lubrication system. The flow capacity through the instrument is so restricted that a minor part only of the oil drawn from the crank case by the pump is delivered into the casing 12 and discharged thence directly back to the crank case. The instrument is designed to measure and indicate the percentage relationship of the viscosity of the crank case oil to a standard, uncontaminated sample of the same oil. The relative viscosity is indicated by a pointer 14 on a scale 16, the pointer and scale being unitary parts of the outer casing. The casing 12 is provided with threaded inlet and outlet passages 18 and 20, through which connection with the discharge side of the pump and with the crank case are respectively effected.

The instrument further comprises an inner unit 22 which is carried by the base plate 24 of the outer casing 12. The inner unit is removable in its entirety with the base plate from the outer casing, upon removal of screws 26, through which the base plate and the outer casing are normally united.

The inner unit comprises a main body portion 28 in whose upper part an upper chamber 30 is formed and in whose lower part, two cylinders 32 and 34 are formed. The chamber 30 contains a collapsible sac 36 in which a standard or reference sample of uncontaminated oil is contained, the interior of the sac 36 being in communication with the cylinder 32.

During operation of the engine, oil enters the casing 12 at 18, and flows down around the body 28 into a lower chamber 46. A part of the oil then enters hollow corner standards 38 and 40, there being one standard 38 and three standards 40, and passes upward into the chamber 30 through orifices 42 and 44. Another part of the oil enters a passage 41 and travels upward past a reducing valve 43, into the chamber 30, suffering in such passage a substantial pressure reduction so that the oil pressure in the chamber 30 is substantially less than the oil pressure in the chamber 46 beneath the body 28. The chamber 30 is constantly in communication with the upper end of the cylinder 34, the connecting means between the chamber 30 and the cylinder 34 on the one hand and between the sac 36 and the cylinder 32 on the other hand, being so related in their flow resistance characteristics, and in relation to the relative weights of the pistons and the relative diameters of the cylinders that the cylinders are caused to fill in inverse proportion to the viscosities of the oils involved. In the illustrative embodiment, the cylinders are of equal diameters, the flow resistances of the connecting means are equal, and the weights of the pistons are equal.

Because the pressure in the chamber 30 is less than the pressure in the lower chamber 46, identical pistons 48 and 50 located, respectively, in the cylinders 32 and 34 are maintained during operation of the engine at the upper limits of their operative strokes, in contact with the upper ends of the cylinders. The instrument is designed automatically to produce an accurate, relative viscosity reading upon stopping of the engine, and to maintain the reading until the engine is restarted.

Upon stopping of the engine the difference of pressure in the chambers 30 and 46 disappears. Both of the pistons 48 and 50 start dropping simultaneously from identical levels as their upper limits of movement. The rate of fall of each piston is limited by the rate of flow of oil into the cylinder above the piston in response to the suction produced in the cylinders by the weight of the pistons. Since the sac 36 is freely flexible, the operating oil and the sac oil are subject to the same pressure. Both pistons are subjected from below to the common pressure in the chamber 46. The sac oil and the oil outside the sac are at the same temperature. While some departure from the exact details of compensation set forth above is possible, the essential point is that the only uncompensated variable factor is the viscosity of the circulating oil. By arranging the mechanism so that the two pistons move a uniform combined or total distance during the test period, the difference of distance moved by the pistons is made a true function of the relative viscosity of the oil bodies. A balancing lever 51 is interposed in the path of edged nuts 52 and 54 which are carried, respectively, by the pistons 48 and 50 and move in unison with the pistons. The final angular position of the lever is determined at the first instant when both the nuts 48 and 50 become simultaneously engaged with the lever. Through a magnetic coupling, angular movement of the lever 51 is applied to the pointer 14 to cause the relative viscosity of the oil being tested to be accurately indicated on the scale.

It is desirable that any difference of viscosity indicated shall reflect a change of viscosity of the crank case oil. To this end it is a feature that provision is made for replacing the sac oil with a fresh sample from the crank case. Provision is accordingly made of means for conveniently and quickly evacuating and refilling the sac at the will of the user. This may be done, for instance, directly after each change of crank case oil, or it may be done when the viscosity of the oil has been deliberately changed by addition of a makeup oil of different viscosity. For this purpose a plunger 56 is operated downward and locked in a depressed position by a cam handle 58, being effective, to uncover a valve port 60 (FIG. 6) through which oil may be delivered in response to engine operation from the chamber 46 to the interior of the sac 36, to open a discharge valve 62 past which oil may be discharged from the sac 36 and the cylinder 32 through the chamber 30, and mechanically to squeeze the sac 36. In the reverse operation of the plunger 56, the valves are closed and the sac is freed for expansion. The squeezing of the sac assures that there will be an adequate reserve capacity to accommodate oil forced up by the piston 48 from the cylinder 32, and expansion of any air entrapped in the sac.

The foregoing description does not purport to give even a bird's eye view of all the novel and important features of the invention. It is intended merely to afford a general comprehension of the invention as a prelude to the detailed description of the illustrative structure, which follows.

The inlet passage 18 of the outer casing 12 lets into a small admission chamber 64, from which the oil travels through a valved passage 66 to the interior of the casing. The valve for controlling the passage 66 consists of a flanged plunger 68, desirably of brass, which is urged downward by a coil spring 70. The plunger 68 is slidably mounted in a threaded cap 72. A valve handle 74 is pivotally connected to the plunger 68 by a pivot pin 76. The valve handle 74 has a flat end which is normally urged against the cap 72 to retain the handle in the upright position shown, and thereby to maintain the spring 70 compressed and the passage 66 open. This is the normal or running position of the valve. The valve may be manually operated to its closed position when it is desired to take a reading without stopping the engine.

The casing is further provided with an outlet passage 78 which leads from the chamber 30 to the opening 20. An opening 80 provided through the top of the casing as an incident of manufacture communicates with the passage 78. A threaded plug 82 closes the passage 80.

The body 28 is provided with a removable cover plate 84 which rests upon the body and which forms a removable cover for the chamber 30. The plate 84 is provided with locating pins 86 near its four corners which fit within the corners formed by the meeting walls of the chamber 30. The screws 26 through which the plate 24 is attached to the vertical walls of casing 12 cause the body 28 to be pressed upward against the cover plate 84 and the cover plate 84 to be pressed upward against a soft gasket 88. The dimensions of the parts are such that the gasket is clamped firmly between the cover plate 84 and the top of the casing 12 to form a sealed joint. The gasket surrounds the opening 90 which leads into the passage 78 and an aligned opening 92 formed in the cover plate 84. The arrangement is such that oil entering the chamber 64 can reach the passage 78 only by flowing downward around the body 28 into the chamber 46 and thence upward through the chamber 30 and the openings 90 and 92.

When the engine is running, oil flows continually from the space 46 beneath the body 28 upward through the posts 38 and 40 and through the passage 41 into the chamber 30. The posts 38 and 40 are desirably of equal external diameters and of equal internal diameters. Oil admission openings 94 at the lower end of the post 38 are, however, of larger diameter than corresponding openings 96 at the lower ends of the posts 40. The small orifices 42 are constantly open, but during engine operation a ball check valve 97 is held upward by the force of the current to partially close the orifice 42. The orifice 42 forms the exit of a passage 98 in the body 28 which communicates with the hollow post 38. A pin 100, disposed across the passage 98, limits descent of the ball 97 when the engine is stopped.

The reducing valve 43 is in the form of a flat leaf spring which covers and closes the upper end of the passage 41. A fitting 102 having an externally threaded cylindrical body and an enlarged frusto-conical base is formed with a fine passage of precisely determined diameter and constitutes the sole channel of communication between the cylinder 34 and the chamber 30. The fitting 102 has its upper end passed through the end of the valve spring 43 which is farther from the passage 41. A nut 104 threaded on the upper end of the fitting 102 clamps the engaged end of the spring 43 firmly down against the bottom of the chamber 30.

The reason for providing three distinctive forms of oil transmission from the space 46 to the chamber 30 rests in the facts that the oil flow should be sufficiently restricted between the space 46 and the chamber 30 to keep the pistons at their upper limits of movement during engine operation, whereas it is desired that the oil shall pass freely from the space 46 into the chamber 30 during the viscosity measuring operation which follow the shutting down of the engine. The orifices 44 are so small that they remain open during engine operation without materially impairing the desired suction effect that holds the pistons up. The larger orifice 42 is closed by the check valve during engine operation to avoid impairment of the suction effect.

When the engine is stopped, however, the difference of pressure between the space 46 and the chamber 30 immediately disappears and the check valve 97 drops to its lower position. The pistons fall slowly under the influence of gravity. At this time it is important that no opposition be interposed to the falling of the pistons which might conceivably affect the uniformity of the conditions under which the pistons fall. To this end, the oil should be free to pass from the chamber 46 to the chamber 30 without encountering any slowing down resistance. Since the pistons are caused to fall slowly, there is no tendency to shift the valve 97 upward. The combined flow capacity of the orifices 42 and 44 is ample to pass the oil freely at the required rate. Since there is no perceptible pressure difference between the chamber 30 and the space 46, the valve 43 remains closed throughout the viscosity measuring operation.

The sac 36, which is desirably a thin walled, completely flexible sac of Hycar, has sealed connections at its mouth with a fixed block 106. A fitting 108, however, identical in all respects with the fitting 102, forms the channel of communication between the block 106 and the cylinder 32. The block 106 is screwed onto the upper threaded end of the fitting 108, a sealing gasket being interposed between the bottom of the block and the floor of the chamber 30. The bore of the fitting 108 communicates with the interior of the sac through a comparatively large passage 110. A baffle plate 112, secured to the inner face of the block 106, extends through a substantial part of the length of the sac near the bottom thereof. The block 106 is also formed with an oil discharge passage 114 which communicates with a side passage 116, the latter passage being normally closed by the valve 62.

The pistons 48 and 50, which are identical in every way, are arranged to be frictionlessly movable between their upper and lower limits of movement. A description of the piston 48 and the immediately associated parts will suffice for both pistons. The piston 48 is formed with a guide flange 118 at its upper end which is of slightly larger diameter than the main body of the piston. The flange 118 loosely fits the cylinder 32 and acts as an upper guide. Holes 120 extend through the flange portion of the piston body enabling oil to pass freely back and forth through the piston between the cylinder space above the piston and the cylinder space beneath the flange. Leakage of oil between the sac 36 and the chamber 46 by way of the cylinder 32 is prevented by the use of a highly flexible sleeve 122 of Hycar. The sleeve is formed as a cylinder with one end closed. The normal diameter of the sleeve is less than that of the cylinder 32 and greater than that of the piston 48. The piston rests in the closed end of the sleeve as shown, and the nut 52 is screwed tightly up against the sleeve on a threaded guide tube 124. The sleeve is turned inside out and the open end is brought down and stretched out and around a circular flange 126 which defines the lower extremity of the cylinder. The margin of the sleeve is secured in an oil tight manner to the flange 126 in any suitable way, as by cementing or clamping.

The guide tube 124 forms a unitary extension of the piston 48. It projects axially downward from the piston and passes loosely around a stationary guide pin 128 which extends upward from the bottom plate 24 of the casing. The piston is formed with an axial bore which extends almost to the top of the piston for accommodating the guide pin 128. The guide pin and bore exerts something of a dash-pot effect, which is relieved by clearance in order that it will not limit the rate of downward movement of the piston during the viscosity measuring operation.

The parts associated with the piston 50 which are duplicative of those described in connection with piston 48 have been given corresponding reference numerals, but will not be separately described in connection with the piston 50. The knife edged nuts 52 and 54 are made circular in form, so that they require no particular orientation but are adapted to cooperate properly with the lever 51 when screwed fully home.

Figures 1, 2:
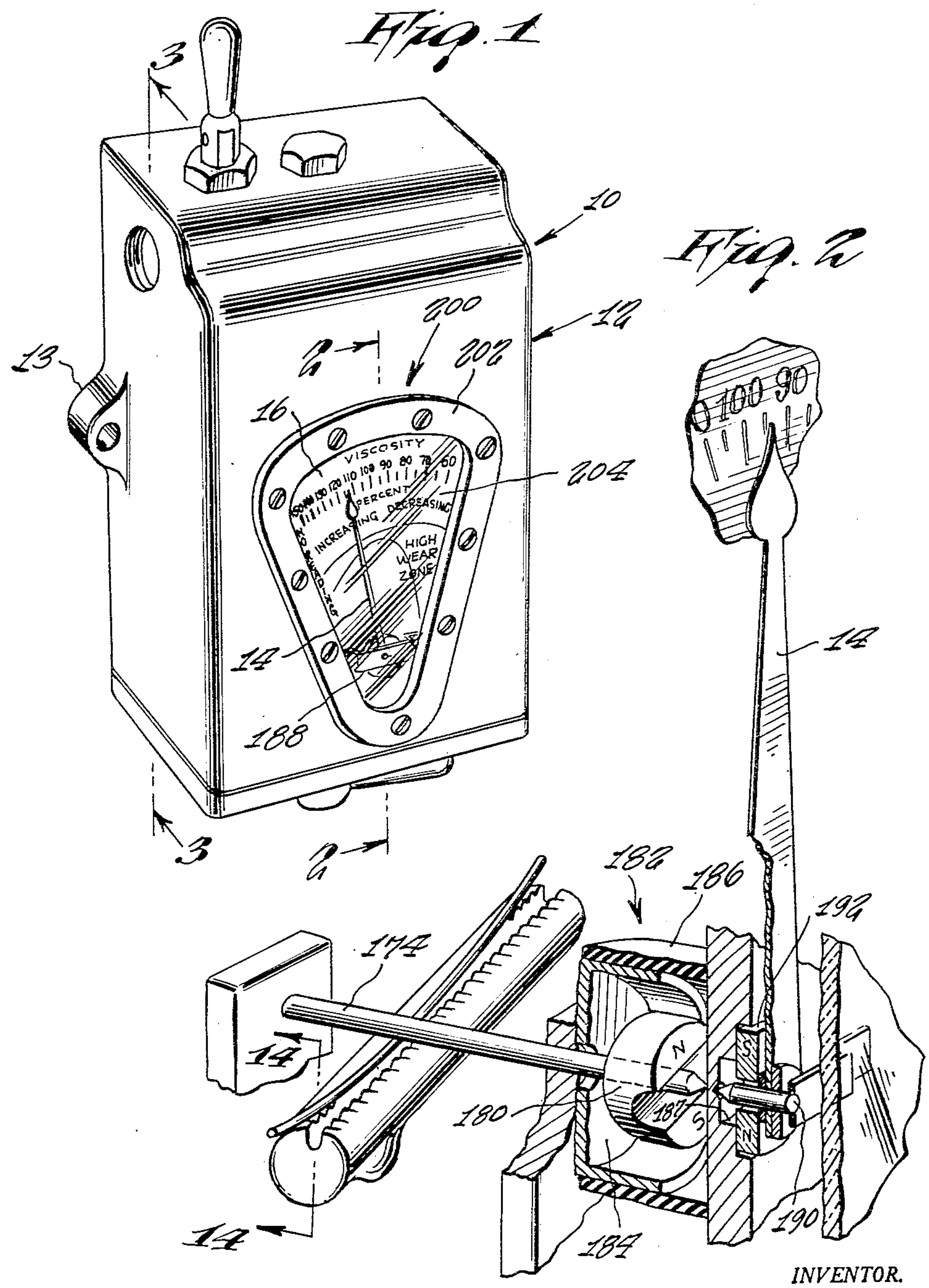
FIG. 1 is an orthogonal projection showing the exterior of an illustrative viscosity gauging device embodying features of the invention.
FIG. 2 is a fragmentary vertical sectional view taken on the line 2—2 of FIG. 1, looking in the direction of the arrows, the view, however, being on a substantially larger scale than FIG. 1.
Figures 3, 4, 5, 6:
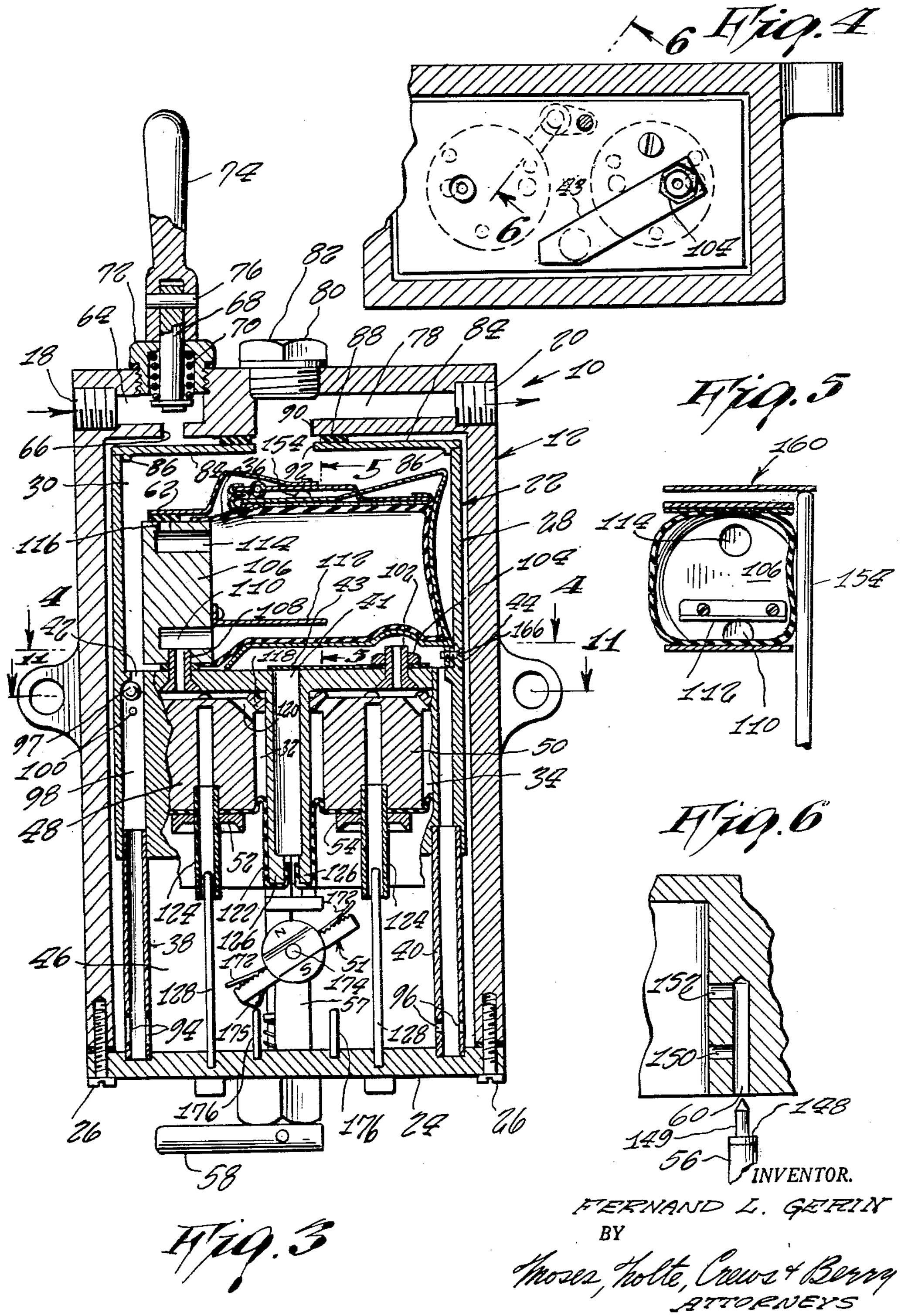
FIG. 3 is a vertical sectional view taken on the line 3—3 of FIG. 1 looking in the direction of the arrows, the view being on an intermediate scale between the scales of FIGS. 1 and 2.
FIG. 4 is a fragmentary horizontal sectional view taken on the line 4—4 of FIG. 3 looking in the direction of the arrows.
FIG. 5 is a fragmentary vertical sectional view taken on the line 5—5 of FIG. 3 looking in the direction of the arrows.
FIG. 6 is an enlarged fragmentary vertical sectional view taken on the line 6—6 of FIG. 4, looking in the direction of the arrows.

The mechanism for causing the oil in the sac 36 to be replaced by a fresh sample (FIGS. 3, 6 and 7) comprises, as has been noted, a plunger rod 56 and an operating handle 58 therefor. The handle 58 is mounted on the plunger rod 56 by means of a pivot pin 132. The rod 56 is slidably mounted in a cap 134, the cap being threaded through the bottom plate 24 of the casing 12. A compression coil spring 136 surrounds the rod 56, bearing upward at its upper end against a collar 138 fast on the shaft, and bearing downward at its lower end against the cap 134. The rod 56 carries at its upper end a soft valve member 148 which is normally pressed upward against a seat that surrounds the lower end of the passage 60. So long as the handle 58 remains in the horizontal position as shown in FIG. 3, the valve member 148 is held upward against its seat by the portion of the spring 136.

Figures 7, 8:
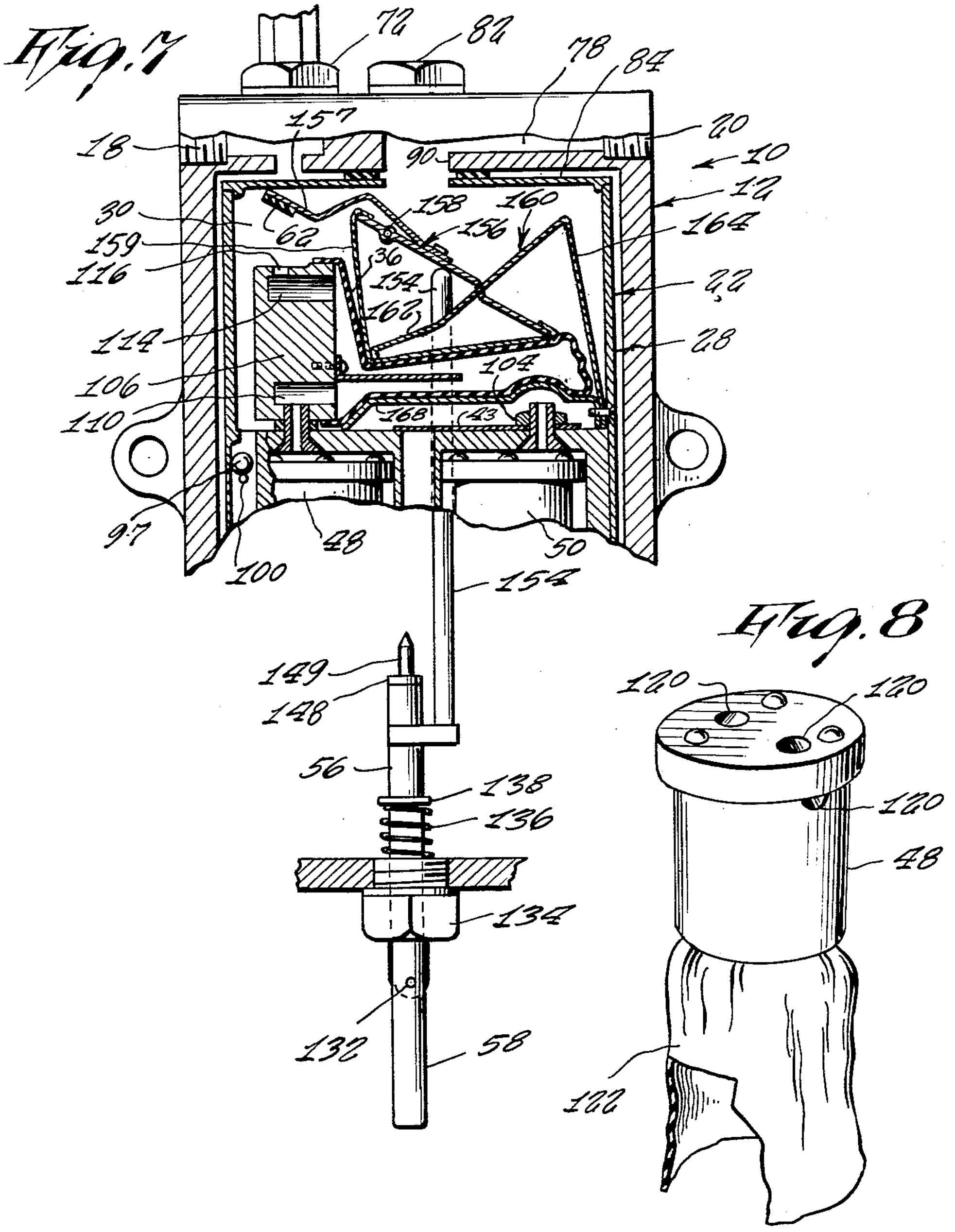
FIG. 7 is a fragmentary vertical sectional view similar to FIG. 3 but partly broken away, and showing the parts in a different condition.
FIG. 8 is an enlarged isometric detail view showing one of two identical piston and sleeve combinations employed in the device.

When it is desired to replace the reference oil sample in the sac with fresh oil, the engine is set into operation and the handle 58 is swung to the vertical position illustrated in FIG. 7, being retained in that position by reason of the fact that the handle has a square end for engaging the cap 134. This withdraws the valve 148 from its seat and thereby places the chamber 46 in communication with the cylinder 32, through the passage 60 and side or branch passages 150 and 152. The upper side passage 152 is located high enough to clear the sleeve 122 even when the piston 48 is in its uppermost position, so that delivery of the replacement oil can never be blocked. Delivery of oil into the cylinder 32 through the passage 152 causes the piston and associated sleeve to move downward thereby unblocking the passage 150. With both passages unblocked, the operation is speeded up.

As the piston 48 moves down, its dead weight maintains a slightly less pressure in the cylinder than that which prevails in the chamber 46. This difference maintains a force on the associated sleeve 122 which stretches the lower stationary part toward the cylinder wall and the part moving with the piston shrinks toward the piston wall. This leaves a clearance space between the stationary and moving parts of the sleeve 122, causing the sleeve to roll effortlessly off of the cylinder wall and onto the piston wall.

The rod 56 has unitary with it an offset extension 154 which extends upward beyond the valve 148 for actuating parts associated with the sac 36. The extension 154 is normally urged upward by the spring 136 into position to engage and hold up the tail of a plate lever 156, upon which the valve 62 is carried through an offset extension plate 157. When the rod 56 is forced downward against the action of the spring 136, the upper end of the extension is drawn downward and the lever 156, which is supported on a pivot 158, is swung clockwise from the position of FIG. 3 to the position of FIG. 7. This operation of the lever is brought about, in response to the mere withdrawal of the extension 154, by a flat, bent spring 160. The spring 160 has a broad left end portion 162 which, together with the tail of the lever 156 forms a sac squeezer.

A flexible strap or link 159, of canvas or other suitable material is secured at its opposite ends to the upper and lower ends of the lever 156. Between its ends the strap 159 passes around the free edge of the broad end portion 162 of the spring 160. It is normally slack but becomes taut as the spring end 162 moves downward, serving thereby to augment the squeezing action.

The spring 160 also includes a comparatively narrow supporting and operating portion 164. The spring portion 164 is passed through a slot in the tail of the lever 156 and is secured by screws 166 to a supporting wall of the body 28. The screw 166 also serves to attach in place a sac supporting platform 168 which overlies the fitting 102 and prevents obstruction of the fitting passage by the sac. Restoration of the handle 58 to the FIG. 3 position automatically restores the plunger 56 and all the parts affected by it to the FIG. 3 position.

It should be noted that the squeezing of the sac is important for several reasons.

(1) It reserves a capacity for sac expansion sufficient to accommodate a cylinder full of oil, so that the piston 48 can return to, and remain in, its fully raised position with the engine in operation without creating internal pressure on the sac oil that would give the sac oil piston an advantage over the other piston when coming to a reading.

(2) It further assures enough expansion capacity to permit any air which may be entrapped in the sac to expand when the temperature rises, without distending the sac, and (3) In conjunction with the baffle plate 112, the squeezing of the sac defines a narrow path for the oil leading from the passage 110 to the passage 116, so that the entering oil does not merely mix with the old oil, but drives the old oil out before it. The capacity of the sac is desirably approximately two times the capacity of the associated cylinder.

The sac squeezer is required because the valve 62 which controls the sac outlet forms a positive closure for the sac. If a simple ball check valve were employed, it would automatically relieve the sac of any excess pressure. A check valve has been tried and found to operate successfully in bench tests with a smooth oil stream from a tank under compressed air pressure, but it has failed in tests on an engine. Some hydraulic effect quickly emptied the sac. It is believed that this effect is set up by the imperceptible pulsation of the oil stream produced by the conventional gear type oil circulating pump. The hydraulic vibration bombards the exterior surface of the sac and drives out the sac oil. It shrivels the sac as effectively as if suction had been applied.

The provision of a positively acting sac discharge valve, in combination with the sac squeezer is, therefore, regarded as an important feature of the invention.

It is important that over-filling of the sac be avoided. There is a danger that this will occur as the rod 56 returns to normal position because the sac squeezer is being raised as the valve 148 moves toward its seat. To restrict the admission of oil during this period the rod 56 is provided with a reduced stem portion 149 which enters the passage 60 as soon as the rod 56 starts to move up. This so restricts the admission of oil to the passage 60 that over-filling of the sac is prevented.

The oil replenishing operation should desirably be allowed to proceed for about five minutes, although there is no objection to continuing it for a considerably longer time.

The balancing lever 51 is in the form of a circular rod having a groove 170 formed from end to end along its upper side. The upper surface of the lever is serrated or toothed so as to engage the knife edges of the piston nuts 52 and 54. A spring 172 of light gauge wire passes through a supporting pivot shaft 174 fast with the lever and has its middle part fixed relative to the shaft. The opposite ends of the spring 172 stands above the lever in position to be engaged by the nuts 52 and 54, before the nuts can engage the body of the lever itself. The spring is strong enough to push the lever ahead of a falling piston, but it is too weak to support the weight of a piston.

The left end of the lever 51 is made slightly heavier than the right end as by application of a drop of solder 175 to the left end, so that the lever normally occupies an inclined position in engagement with a stop pin 176, like that illustrated in FIG. 3. If the oil viscosities are equal during a test, the nut 54 will engage the spring 172 first, and through the spring it will push the lever before it until a horizontal condition of the lever is attained. At that point, the nut 52 becomes engaged with the opposite end of the spring 172, the spring end becomes depressed into the groove, and the nut becomes engaged with the serrated face of the lever, blocking the lever against further turning in either direction. Were it not for the serration of the lever, the lever would generally tend to depart from the correct viscosity indicating position under the influence of vibration.

If it be assumed that the sac oil is of lower viscosity than the engine oil, and the difference is greater than the measuring and indicating range of the instrument, the guide tube 124 of the piston 48 will strike the base plate 24 and be arrested by it before the nut 52 has engaged the lever 51. When the nut 54 reaches the lever spring 172, the lever is caused to turn clockwise, causing the opposite end of the lever spring to rise into engagement with the piston nut 52. Both ends of the spring now give way, and the piston nut 54 moves the lever a little farther until the knife edges of both piston nuts engage the serrated edges of the lever. Thus, the pointer is moved away from the NO READING position even when the sac oil is thinned beyond the measurable range.

The shaft 174 is rotatably supported in the opposite arms of a U-shaped bearing bracket 57, the bracket being rigidly attached to the base plate 24. A permanent magnet 180, having diametrically opposed north and south poles, is affixed upon the shaft 174 for rotation in unison therewith. The magnet 180 serves as one element of a magnetic drive coupling from the shaft 174 to the pointer 14.

It has been found that the magnet 180, if unprotected, will withdraw ferro-magnetic particles from the oil and accumulate them on its surface. Such particles become jammed in the space between the magnet and the adjacent wall of the outer casing 12. In order to overcome this drawback, a cup-like enclosure 182 is provided around the magnet 180. The enclosure consists of a metallic cup 184 which is attached to the bracket 56, and a sleeve 186 of highly flexible material, such as Hycar, which surrounds the cup and protrudes forward beyond the rim thereof. The enclosure provides a substantially sealed chamber for the magnet 180. It is not essential, however, that the seal be perfect, so long as the circulation of oil past the magnet is prevented.

The face of the casing 12 is provided with a circular recess 187 which is adapted to be disposed in coaxial relation with the shaft 174 when the inner and outer units are assembled with one another. A bearing strap 188 has its end affixed to the face of the casing 12 and its intermediate portion spaced therefrom. A pointer shaft 190 has one end formed with a conical tip and engaged in a bearing recess at the center of the recess 187. Between the front wall of casing 12 and the bearing portion of the strap 188, shaft 190 has affixed upon it a permanent magnet 192 having diametrically opposite north and south poles, and a pointer 14. The magnet 192 is circular in form and fits freely within a further circular recess 198 formed in the front wall of the casing 12.

The scale 16 is painted or otherwise suitably applied directly to the face of the casing 12. A scale and pointer cover 200 of transparent plastic material is provided with a marginal flange 202 which lies in a single plane for bearing continuously against the face of the casing 12, and with a raised body portion 204 spaced from the casing wall to provide clearance for the pointer and the operating mechanism thereof. Suitable headed fasteners, such as screws 206, have their bodies passed through the margin 202 and secured in the front wall of the casing 12.

In view of the proximity of the two magnets on the shaft 174 and pointer shaft 190, each magnet completes the circuit for the other, and external ferro-magnetic bodies such as the engine, do not disturb the accuracy of the transmission. In the illustrated instrument, the only ferro-magnetic material employed is in the magnets themselves.

Because of the normally tilted condition of the lever 51, the pointer is kept in the "NO READING" position to the left of the scale, during running of the engine. The pointer will never occupy this position with the engine at rest.

It is believed that the general operation of the instrument will be clearly understood from the foregoing description. There is, however, an important feature which requires to be pointed out and explained. It will be observed that at the start of a test run, both the pistons 48 and 50 are at the upper limits of their movement, spaced from the top of the cylinders only by small spacing projections which are provided on the upper piston faces. In these positions of the pistons the nuts 52 and 54 are located at a common level a considerable distance above the point at which the spring 172 could first be engaged by the nut 54. This range is hereinafter referred to as the inactive or lost motion range. The available range of travel below the inactive or lost motion range is hereinafter referred to as the "active" range. The fact that the lost motion range is provided is a point of great practical importance.

If the movement of one piston which occurs in the lost motion range is called L, the combined lost motion of the two pistons is always 2L. The combined motion of the two pistons in the active range may be called A. The combined travel of the two pistons is always $2L+A$. If the viscosity of the crank case oil is two-thirds of the viscosity of the standard or reference sample, the left hand piston will travel downward during a test two-thirds as far as the right-hand piston; i.e., the left hand piston will travel $\frac{2}{5}(2L+A)$ and the right-hand piston will travel $\frac{3}{5}(2L+A)$. The difference of travel $\frac{1}{5}(2L+A)$ corresponds to the difference of final elevation of the two pistons, and is proportional to the tangent of the final angle of deviation of the pointer from the 100% point on the scale. If the instrument is so designed that $L=2A$, then $\frac{1}{5}(2L+A)$ becomes $\frac{1}{5}(5A)$ or A. For this design the limiting measurable ratios would be two-thirds and three halves. If L, on the other hand, should be reduced through a redesign of the instrument be equal to A, then $\frac{1}{5}(2L+A)$ would become $$\frac{3A}{5}$$

and the tangent of the angle of displacement of the pointer from 100% for the assumed viscosity ratio of two-thirds would be correspondingly reduced. Finally, if the lost motion were eliminated altogether, $\frac{1}{5}(2L+A)$ would become $$\frac{A}{5}$$

still further reducing the angular displacement of the pointer from 100% for the assumed viscosity ratio. As the lost motion is reduced, the scale becomes more crowded.

The fact is not overlooked that as the lost motion is reduced, the available range ratios is increased. Ratios outside the limits of 60% to 150% are, however, of no practical interest. Nothing of practical value would be gained therefore, be making ratios outside those limits available on the scale. On the contrary, the same scale space which would be allotted to viscosities ranging from zero to infinity with no lost motion, can be allotted to the useful range of indications between 60% and 150%, so that a much more open scale is provided by virtue of the fact that a predetermined amount of lost motion is provided.

It is a further point of advantage that the instrument is designed to cover the desired range of viscosity ratios while limiting the angular range through which the pointer actuating arm is moved. This is advantageous because it provides a comparatively even scale spacing.

If we consider the angle $x$ made by the lever 51 with the horizontal, it is evident that the angle is reduced as the right-hand piston in moving downward forces the arm clockwise toward the horizontal position, but that the ratio of angular movement of the arm to the linear movement of the piston varies. It is apparent that the ratio of arm movement to piston movement (output-input ratio) increases as the arm moves downward until the horizontal position of the arm is reached, and that as the downward movement then continues, the ratio progressively decreases. This tends to make for a scale which is crowded at the ends but open in the middle.

The exact character of the variation is readily ascertainable. The piston moves downward in a straight vertical line and therefore engages the lever 51 at a fixed horizontal distance $h$ from the arm fulcrum. If the variable distance from the point at which the edge of nut 54 engages the lever 51, to a horizontal line through the fulcrum axis of the lever be designated as $v$, then it is evident that $$\frac{v}{h}$$

is constantly equal to tangent $x$. The rate of change of $x$ with respect to change of $$\frac{x}{h}$$

will be $$\frac{dx}{d \tan x}$$

Since $$\frac{d \tan x}{dx}=\frac{1}{\cos^2 x}$$

$$\frac{dx}{d \tan x}=\cos^2 x$$

In the horizontal position of the lever 51, $x$ is zero and the cosine is 1. At that point, $h$ times the rate of change of the angle $x$, measured in radians, will be equal to the rate of linear change of position of the piston.

When the lever 51 is inclined 30° to the horizontal, $\cos^2 x=\frac{3}{4}$, an unobjectionable departure from the maximum output-input ratio. If the piston and arm engagement were still maintained at a 60° inclination of the arm, however, $\cos^2 x$ would then be $\frac{1}{4}$. At this point the output-input ratio would be diminished to one-quarter of the maximum ratio and the scale would be impractically crowded toward the sides. The limits of movement of the arm with respect to the horizontal should, therefore, lie well within the range of +60° to −60°, and preferably within the range of +45° to −45°, at which limits $\cos^2 x=\frac{1}{2}$.

The importance of this is accentuated by the fact that the percentage scale necessarily becomes more compact as the indicated percentages increase in value. A viscosity ratio of 2 to 3 referred to 100% as the greater viscosity would correspond to 66⅔% on the scale, whereas a viscosity ratio of 3 to 2 referred to as 100% as the lesser viscosity, would be designated as 150% on the scale. Since these two ratios represent the same amount of difference of travel of the two pistons, equal spacing from the 100% mark would be allotted on the dial to 66⅔% and to 150%, the former space covering a range of 33⅓ and the latter a range of 50%.

Figure 16:
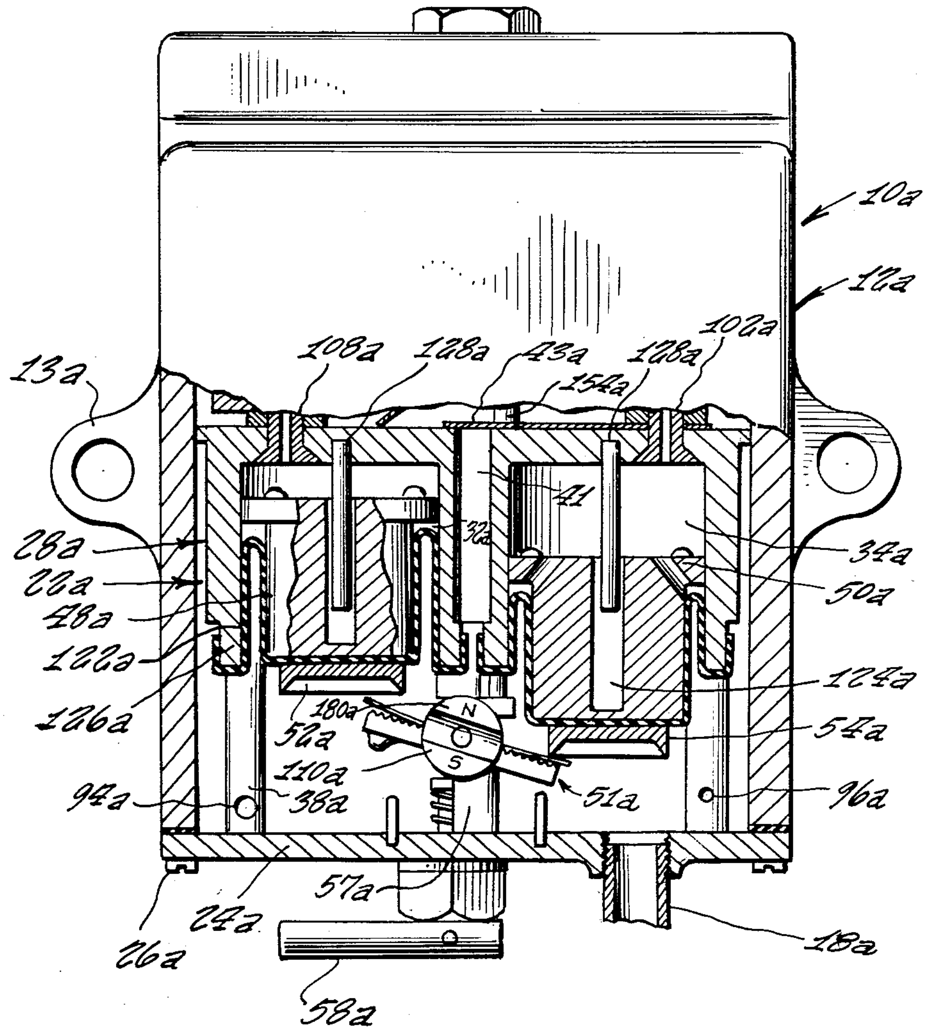
FIG. 16 is a view in front elevation, partly broken away, of a further instrument illustrative of viscosity gauging devices embodying features of the invention.

The instrument illustrated in FIG. 16 is generally like the instrument of FIGS. 1 to 15, but it embodies certain distinctive structural features which enable it to be made of less height, and to give equally useful indications of relative viscosity with shorter piston strokes and with less motion of the pistons relative to the balancing lever. The reduction of dimensions results in a substantial saving of cost. Since the FIG. 16 instrument, except for dimensions, essentially duplicates the instrument already described in most of its features, corresponding reference numerals have been applied to corresponding parts with the subscript $a$ added in each instance, and the description will be confined to the features of difference.

The instrument of FIGS. 1 to 15 is well adapted for diesel engines, trucks, and the like, but is somewhat large and expensive for use on pleasure vehicles. The improvements of FIG. 16 are designed primarily to bring the instrument within the general automotive range.

The most significant point of difference found in the embodiment of FIG. 16 is that the piston guide rods 128*a*, instead of being carried by the bottom plate of the outer casing, are carried by the top walls of the cylinders, and extend downward into the pistons. They may extend at their lower ends into tubes 124*a* which are carried by the pistons and which are closed at the bottom.

With this arrangement descent of the pistons is opposed, as before, by the resistance to passage of oil through the fine bores of the fittings 102*a* and 108*a*, but descent is additionally opposed by a flow resistance effect produced by the rods 128*a*, the pistons 48*a* and 50*a*. In the previous case, there was a flow resistance effect but it occurred for both pistons in the same oil, to wit, the engine oil contained in the chamber 46. The previous flow resistance effect, moreover, did not diminish as the pistons moved down, but if anything it increased as the pistons moved down.

In the present case, the rod 128*a* which is located in the cylinder 32*a* operates in the sac or reference oil, whereas the rod 128*a* which is located in the cylinder 34*a* operates in the engine oil. To the extent that the two oils are different in viscosity, the dash-pot resistances are different. Thus, if the engine oil is less viscous than the sac oil, the resistance to flow through the fitting 102*a* will be less than that through the duplicate fitting 108*a* and the dash-pot resistance in the cylinder 34*a* will be correspondingly less than the dash-pot resistance in the cylinder 32*a*. This tends to increase the difference of rate of the two pistons, and hence the difference of total travel of the two pistons in a given time.

The new arrangement has the further, very important advantage, moreover, that as the pistons descend, the dash-pot resistances diminish. The piston 50*a*, which is assumed to be operating in the less viscous oil, therefore, will get a faster start and, because that piston runs ahead of the other piston, it will gain a further advantage from the fact that the dash-pot resistance is progressively diminished. That is to say, the piston 50$a$ will be ahead in phase with respect to the diminishing dash-pot resistance, and it will gain progressively by reason of that very fact. The result of this is that for any selected viscosity of engine oil, the difference of travel of the pistons will be further increased for a given length of stroke and for a given amount of lost motion. The cylinders can be shortened, the lost motion can be reduced, the oil sac can be reduced in volume, and the balancing lever can be located nearer to the lower ends of the cylinders than before. The bottom plate 24 can also be moved up closer to the balancing lever than before. The instrument in its entirety can, therefore, be materially reduced in height.

FIGS. 17 to 26 which indicate another embodiment of the invention includes a viscosity indicating instrument generally designated 310 (FIGS. 17 to 22). The instrument 310 includes an elongated casing 312 to which is tightly fitted a bottom piece 314, a gasket 316 being provided to seal the connections therebetween. The external casing parts are made of a non-magnetic metal.

The bottom piece 314 is provided with an inlet opening 318 formed in a projecting portion 315 and having an inlet one-way or check valve 320 located therein. The inlet opening 318 is also provided with a stop valve (not shown) which is operated by a stem 322 which extends laterally from the projecting portion 315 of the bottom piece 314. The instrument is normally mounted adjacent, or, on an engine block by bolts which extend through openings 324–324' on each side of the top, and openings 326–326' on each of the bottom of the instrument casing. The inlet opening 318 leads to the interior of the casing.

The inlet opening 318 (FIG. 19) is connected to the oil pump discharge or other pressure line in the system of the fluid being tested. A discharge opening 328 is provided at the top of the casing 312, and this is usually connected to the sump of the lubricating or other fluid system. The flow through the instrument is so restricted that a minor part only of the fluid circulated by the operating pump of the system is delivered into the casing 312 and discharged through the outlet 328.

The lower portion of the casing 312 is of a greater internal dimension than the upper portion, thereby forming a ledge 330 against which is fitted a sealing ring (not shown) over a partition member generally designated 332, which divides the interior of the casing 312 into an upper chamber or compartment 334 and a lower chamber or compartment 336. The partition 332 is supported in this position by three corner posts 335 and a conduit to be designated hereinafter.

The underside of the partition member 332 is hollowed at two locations to form a hollow cylindrical standard fluid testing chamber 338 and a hollow cylindrical test fluid testing chamber 340. Each of the testing chambers 338 and 340 are provided with concentric cylindrical guide posts 342 and 344, respectively. Identical hollow weight assemblies 346 and 348 are arranged to reciprocate along the guide posts 342 and 344, respectively. Leakage of fluids from or into either of the chambers 338 or 340 around the edge of the weights 346 or 348 is prevented by highly flexible coverings 350 and 352, respectively, made of Hycar or similar rubber or plastic material, which is adhesively secured to the partition member 332 and the bottom of each associated weight. Combination securing and indicating nuts 354 and 356 are secured to a respective lower cylindrical extension 358 and 360 from each of the weight assemblies 346 and 348, respectively.

The post 342 extends through the partition 332 and is secured by a nut 362. The posts 342 and 344 are hollow and are provided with slit openings 364, which afford fluid communication between the chamber 340 through a passage 366 to a standard fluid storage chamber 368 and the chamber 338 with the chamber 334. It should be noted that the slit openings 364 are uncovered by the weights 346 and 348 as they move downwardly, so that the greater the travel of the weights 346, 348, the greater will be the opening permitting fluid flow from the connecting chambers to the chambers 338 and 340.

Fluid which is directed through the opening 318 at the bottom of the casing 312 is directed outwardly in a steady stream through a small opening 369 (FIG. 19) to maintain the bottom of a chamber 336 clear of debris in the vicinity of the bottom of the plunger 348. A portion of the liquid is also continuously directed through a small diameter tube 372 (FIGS. 18 and 27) into a vertically elongated conduit generally designated 376. The conduit 376 is centered on its lower end over an upstanding stud 378 (FIG. 27) having a conical top portion which is in alignment with the inlet opening to the tube 372. The upper end of the conduit 376 is connected to a diagonal passage 380 cut through the partition wall 332, and terminating at its upper end in the chamber 334. The interior of the conduit 376 is narrowed at its upper end to form a flow passage of smaller diameter and an internal shoulder 379. The conduit includes a small diameter jet pipe 381 which is arranged to direct fluid which enters the interior of the conduit 372 downwardly through the jet tube to the area beneath a weighted member 346 in order to maintain this portion clear of dirt and foreign substances. The conduit 376 contains a valve mechanism which provides for a large flow of liquid between the upper chamber 334 and the lower chamber 336 during periods of actual cycling to a reading during testing in order to eliminate any pressure differential which may exist between these chambers which would influence the dropping of the weights 346 and 348. At other times, a pressure differential is maintained between the upper chamber 334 and the lower chamber 336 to cause the weighted members to be forced up by the higher pressure maintained in the lower chamber 336. Control of this pressure differential is obtained by a pressure control valve in the manner to be described more fully hereafter.

When the instrument is connected to a source of fluid pressure, the pressure in the standard fluid chamber 368 and the fluid chamber 334 is maintained at a lesser amount than the pressure in the lower chamber 336. This has the effect of cocking the instrument, that is positioning the weights 346 and 348 at the tops of chambers 338 and 340 in position for initiating a viscosity test.

Figure 19:
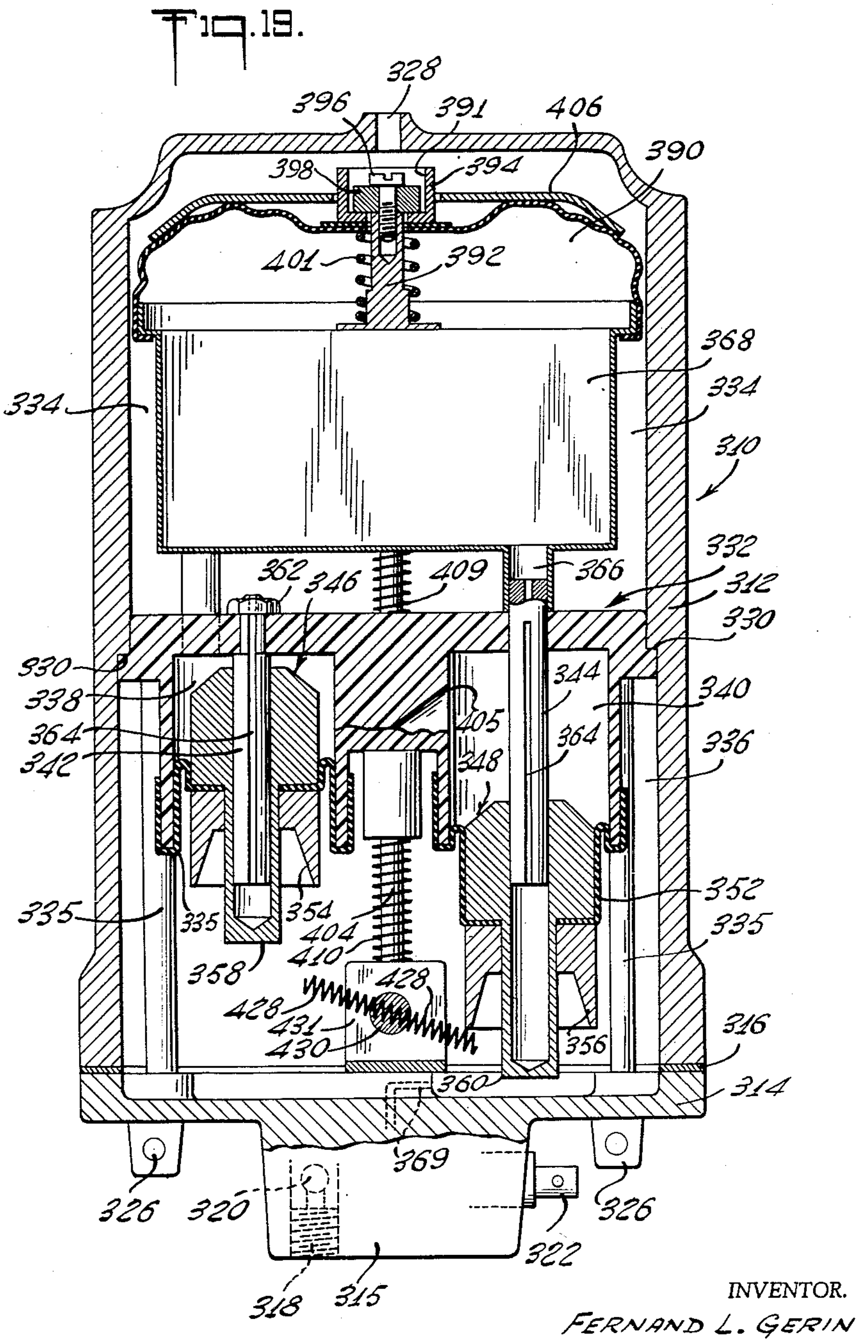
FIG. 19 is a vertical section taken on line 19—19 of FIG. 17.
Figures 20, 21:
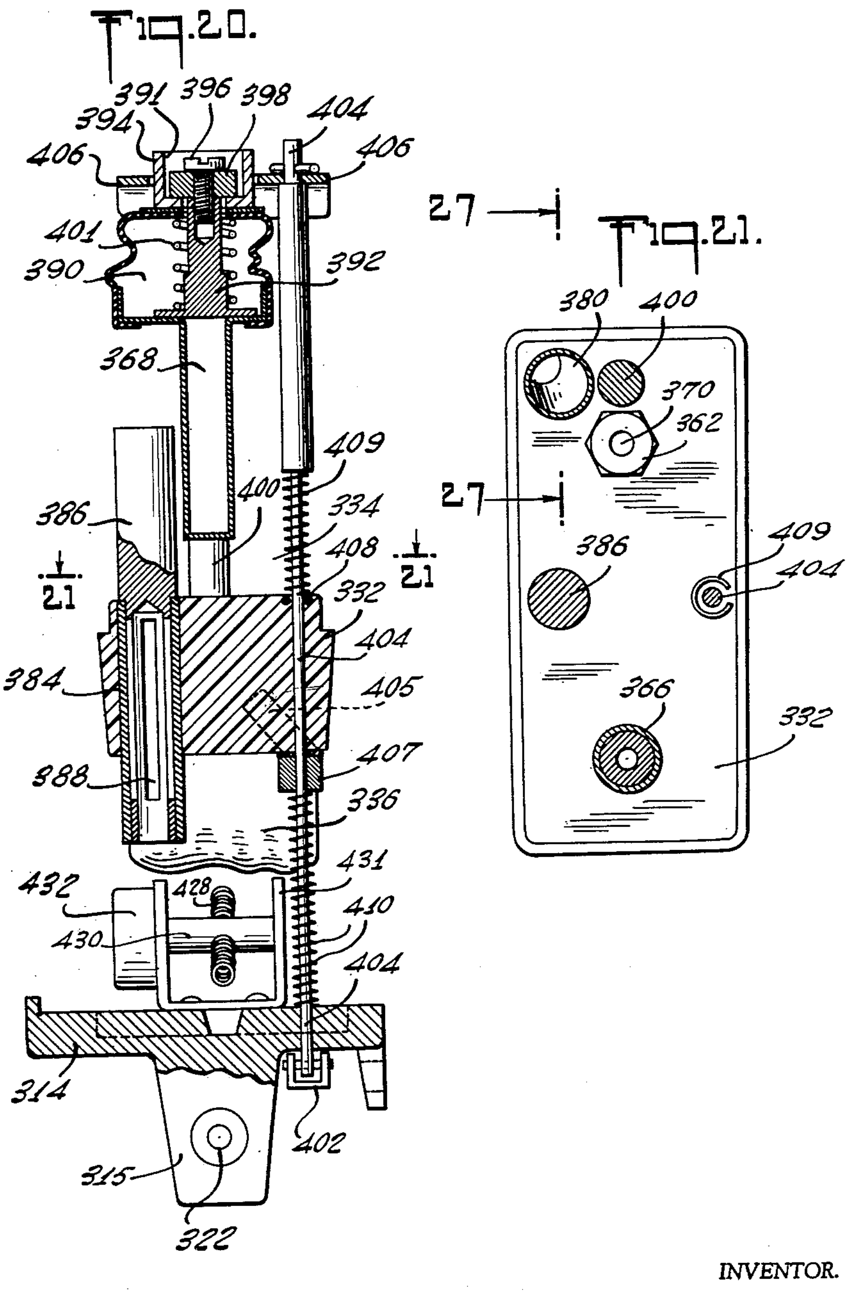
FIG. 20 is a vertical section taken along line 20—20 of FIG. 18.
FIG. 21 is a horizontal section taken along line 21—21 of FIG. 20.

Control of the flow through the conduit 376 (FIG. 27) is controlled by a ball check valve, generally designated 382. The ball check valve 382 includes a spherical upper portion 382$a$, a central body portion 382$b$ of slightly smaller diameter than the diameter of the spherical portion 382$a$, and a lower skirt portion 382$c$ of the same diameter as the diameter of the spherical upper portion 382$a$. The valve 382 normally rests on a stud 378 in a zero flow position (see FIG. 27). In this position the only passage open to flow through the meter is the small opening 369 (FIG. 19). The oil flows from the opening 369 into the opening 383 and into compartment 334. Since the opening 369 is small the resistance to flow therein increases rapidly with increase in pressure and causes rapid pressure buildup in the duct 372. When oil is pumped through the inlet 372, it causes the ball check 382 to move upwardly off the stud 378. The ball check 382 rises until its skirt 382$c$ clears the opening for the jet tube 381 and the ball portion closes opening 379. Liquid flows out through the jet tube 381 into the compartment 336, where it may flow upwardly to the compartment 334 through a pressure control or piston valve 386 to establish on the pressure differential between the upper chamber 334 and the lower chamber 336. Substantially all the pressure in the conduit 372 works to lift the ball valve 382. The central portion of the conduit is provided with an opening 383 intermediate its height. The spacing of the three openings 372, 381 and 383 and the size of the check valve 382 are such that when the ball portion of the check valve 382 closes the opening 379 and therefore the opening 383, the skirt portion 382c clears the duct 381. Thus when the engine is idling the low oil pressure can nevertheless shut off the large opening 383 otherwise no internal pressure differential could be established.

The weight of the ball check 382 is such that it will drop down by its own weight after fluid supply pressure has been stopped or upon the starting of a viscosity test. When a viscosity test is being run, the dropping of the ball valve 382 allows a rapid equalizing of the pressure between the upper compartment 334 and the lower compartment 336. There is a delay period before the ball actually falls by its own weight, but once it does, the piston weight 346 and 348 are free to move downwardly in viscosity testing.

Fluid may also flow from the lower chamber 336 to the chamber 334 through a cylindrical conduit 384 (FIGS. 18, 20, 21 and 25) which extends through an opening in the partition member 332. The cylindrical conduit 384 is provided with a piston valve 386 which seals the upper end of the conduit 384 on all occasions except when the pressure in the lower chamber 336 is great enough to overcome the piston weight and lift the piston 386 and permit fluid communication between the compartments 334 and 336 through elongated slit openings 388 at the lower end of the piston valve 386.

The standard test fluid chamber 368 (in the embodiment shown in FIGS. 17–25) is substantially rectangular and is connected at its upper end to an expansible chamber 390 made of a flexible material such as Hycar. An upstanding supporting member 392 is fastened to the top of the standard fluid chamber 368 and extends upwardly inside the expansible chamber 390 through an opening in the top thereof. The top opening of the expansible chamber 390 is cemented to a hollow open-ended cylindrical cup 394 having a central opening 391. The cup 394 is slidable on the upstanding member 392. A bolt 396 holds a washer 398 over the opening 391 to seal the latter when the chamber 390 is in the expanded position (FIG. 19).

The expansible chamber 390 may be compressed to force a portion of the standard fluid out of the chamber 368 through the opening 391 of the cup 394, by manually turning a lever 402. The lever 402 is located at the bottom of the instrument and is normally shown in the position indicated by the solid lines in FIG. 22. When it is desired to replace the standard fluid in chamber 368, the lever 402 is turned to the dotted position indicated in FIG. 22.

The lever 402 is pivotally connected to an elongated rod 404 which is secured to a compressor plate 406 at its upper end and at an intermediate location is secured to a chamber sealing block or cylinder valve 407. In the full line position of the lever 402 (FIG. 22) the block 407 closes off a passage 405 opening to the partition member 332 leading to the chamber 340 (FIG. 19). A packing ring 408 is provided in the partition member 332 adjacent the rod 404 to prevent leakage between chambers 334 and 336 at this location.

Figure 22:
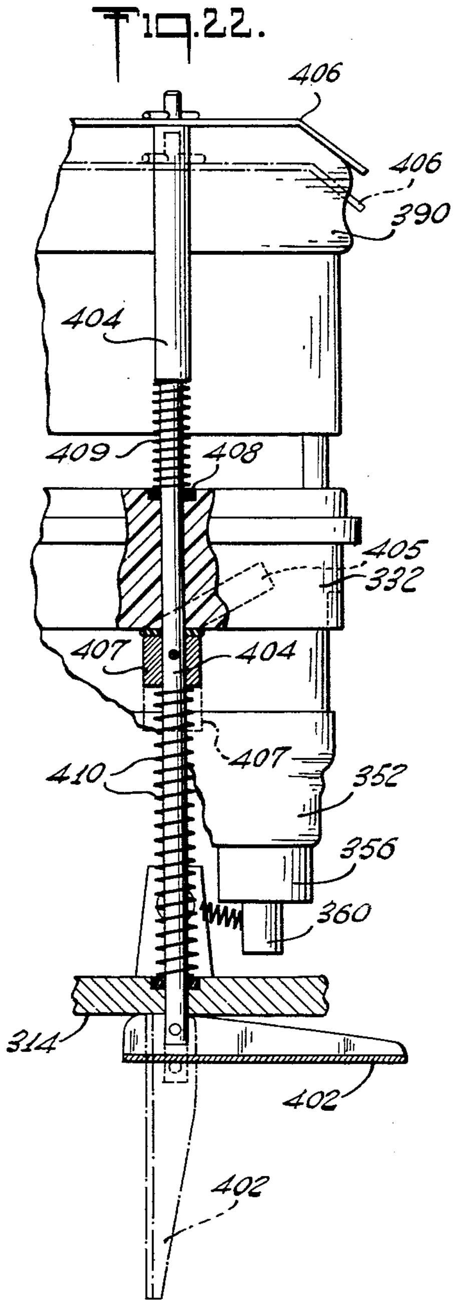
FIG. 22 is a fragmentary vertical section similar to FIG. 20 and indicating the mechanism for collapsing the reference specimen chamber.

The rod 404 is moved downwardly by movement of the lever 402 to the dotted line position indicated in FIG. 22 and it moves against the force of an upper and lower compression spring 409 and 410 respectively. The compression spring 409 is held between the partition member 332 and a widened upper portion of the rod 404. The compression spring 410 is held between the block 407 and the base plate 314. The downward movement of the lever 402 effects communication between the chambers 336 and 340 through the passage opened by the displaced block 407. At the same time the downward movement of the lever 402 effects the compression of the expansible chamber 390 as the cover plate 406 is pulled downwardly thereon. This downward movement of the block therefore effects opening of the top of the expansible chamber by displacing the cup 394 and uncovering the opening 391. This effects discharge of the standard oil from the chamber 368 through the opening 391. A new oil specimen is thereby delivered to the chamber 368 from chamber 336, past inserted valve block 407, through passage 405, cylinder 340 and passage 366. The piston 348 in the cylinder 340 may drop because the pressure inside the cylinder approaches the pressure in the lower compartment. Thus a new specimen is delivered upward through the passage 366 to the chamber 368 while the old specimen is being discharged through the opening 391.

A compression spring 401 on the member 392 closes the outlet valve 391. This raises only the central portion of the expansible chamber and leaves the main portion limp when the lever 402 is closed. The lever 402 closes with a snap action and effects closing of the opening 391, as well as the passage 405 communicating between the chamber 340 and the chamber 336 and it raises the cover plate 406. This permits the pressure differential for piston 348 to be re-established and causes the piston 348 to rise and push additional oil from the chamber 340 into the chamber 368. The expansible chamber 390 having been compressed by plate 406 during the filling operation affords room for the extra oil.

When the instrument is connected to a pressure fluid source, valve 382 closes and the pressures in the compartments 368, 334 and 336 under control of valve 386 will be such that the weights 346 and 348 will be held in the uppermost position in the chambers 338 and 340. When a test is to be run, the valve stem 322 is pushed inwardly to close off the fluid pressure. Thereupon after a slight delay, downward movement of the weights 346 and 348 is effected in proportion to the viscosities of the oil impelled thereby from the respective chamber 334 or the standard chamber 368, and dynamic head operating on each of the weights. This total head is the algebraic sum of the head above the orifices and the suction head below the orifices.

Prior to the cycling of the instrument during testing the fluid in the chamber 390 is maintained at substantially the same temperature as the test fluid by circulating the fluid through the instrument and around the chamber 390. The fluid level is always maintained above the top of the chamber 390. Both pistons 346 and 348 replenish the oil in the compartment 334 by flow through the opening 383, 379 and 380 during their descent.

The bottom of the indicating nuts 354 and 356 form a circular knife edge and when they descend in a test the pointed portions engage a balance member 428.

The balance member 428 is pivoted at its center on a shaft 430 rotatably mounted on a U-shaped bracket 431 which is connected at its one end to a rotating magnet (not shown) within a housing 432. The magnet housing 432 is positioned adjacent a similar magnet (not shown) in a housing on the opposite side of the casing and inside a glass front 433, and which is connected to an indicator needle 434. The magnet (not shown) is attached to the lower end of the needle 434 and the needle is pivotally mounted. Movement of the magnet in the housing 432 effects similar movement of the magnet attached to the needle 434, and causes the needle to move to indicate relative viscosity.

Relative viscosity is indicated when, after the first indicating nut hits the spring 428 and rotates it somewhat, the other indicating nut contacts the spring to hold it in a relative viscosity indicating inclination. The balance 428 is constructed of a resilient spring in order to insure that the knife edges of the indicating nuts will remain in the position of contact between spring coils and that vibration will not knock it out of the position achieved when both nuts made initial contact.

Figure 23:
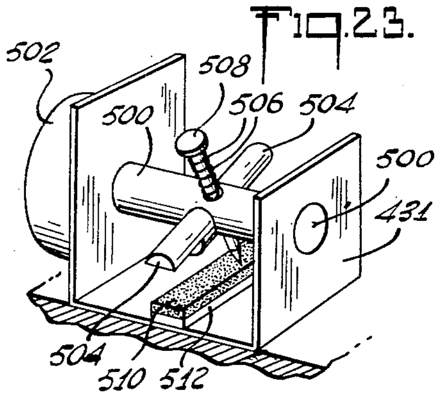
FIG. 23 is a fragmentary perspective view of another embodiment of indicating mechanism balancing arm.
Figure 24:
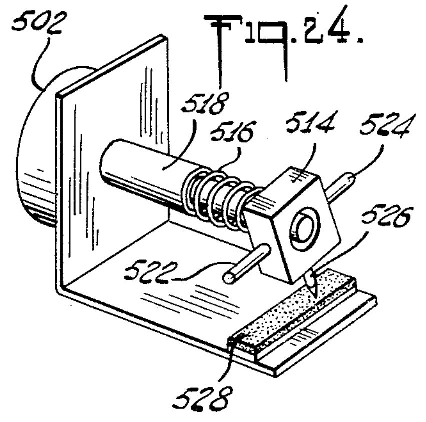
FIG. 24 is a fragmentary perspective view of still another embodiment of balancing arm.

Referring to FIGS. 23 and 24 there are indicated alternate embodiments of viscosity-indicating mechanisms. In FIG. 23 there is indicated an embodiment in which there is provided the usual U-shaped bracket 431 on which is mounted a shaft 500 and which is connected on one end to a magent 502 on the opposite side of the bracket 431. The magnet rotates with the shaft 500 to control the movement of an indicating needle simliar to the previous embodiment. In the present embodiment, the balance spring 428 is replaced by an arm 504 which is positioned within a semi-circular groove on the underface of the shaft 500 and which is biased upwardly against the shaft by a compression spring 506 which urges a rod member 508 which is secured to the arm toward an upward direction. The rod member 508 is secured to the arm 504 and extends a considerable distance therebeneath and is provided with a pointed end. The arrangement permits contact of the arm 504 by the circular knife edges of the descending nuts 354 and 356 and rotation of the arm along with the shaft 500 to a viscosity indicating position whereupon each nut is in contact with the arm. As soon as the second nut contacts the arm 504 the arm is depressed downwardly and causes the pointed end of the rod member 508 to be impressed in a Hycar pad 510 which is secured to a plate 512 on the bracket 431. With the pointed end of member 508 positioned in the rubber pad 510, the shaft 500 can no longer rotate and there is no possibility that the instrument needle will be deflected from its viscosity indicating position until outside pressure is connected to the interior of the instrument and testing has ceased. The above arrangement assures that once the viscosity test has been run and an indication is given, there will be no possibility of the indication being changed due to vibration or similar forces.

Another alternate embodiment of indicating control mechanism is indicated at FIG. 24 in which a block 514 is mounted on the end of a coil spring 516 which is affixed through a shaft 518 bearing a magnet 520. The shaft is mounted on one of the plates of the bracket 431 so as to position a pair of laterally extending arms 522 and 524 on the block 514 beneath the descending weights 346 and 348. The lower end of the block 514 is provided with a pointed member 526 which is arranged to become embedded in a rubber pad 528 on the bracket 431 after the arms 522 and 524 have been contacted by each of the nuts 354 and 356 and the correct viscosity reading has been arrived at by rotation of the shaft spring 516 with the shaft 518.

One of the important functions of the valve conduit 376 and associated valve mechanism is to provide a large opening from the upper chamber 334 to the lower chamber 336 when the weights 346 and 348 are descending in a viscosity-testing cycle. By insuring the communication between the chamber 334 and 336 is sufficiently large at this time, there will be a minimum of back pressure on the pistons, to adversely affect the reading of viscosity. While the pistons are descending they displace oil in the lower compartment 336 which must flow to the upper compartment 334. Any resistance to this flow causes a back pressure as mentioned above, which counterbalances the weight of the pistons. The existence of any back pressure reduces the effective piston weight which increases the relative magnitude of inequalities and magnifies the viscosity indication error which might result from inaccuracies of manufacture of the weights 346 and 348, or from unequal friction.

Another feature of the operating mechanism of conduit 376 is that it affects closing of the conduit 376 between the chamber 334 and 336, when the engine oil is flowing through the instrument between testing cycles. Normally the smaller the opening between the upper compartment 334 and lower compartment 336, the less will be the flow of fluid required to produce a good pressure differential between these compartments.

When the flow of fluid is stopped in order to take a viscosity reading, the pressure is released slowly through predetermined slight leakage past ball valve 382 and there is a short but appreciable time lag before the pressure in the lower compartment no longer maintains the weights 346 and 348 in their raised position. If this time lag persists until the pressure is reduced to the zone where the weights are on the verge of descending, the least inequality in weight would cause the heavier weight to start its descent before the other weight is started. However, with the novel valve construction 382, the pressure differential between the upper compartment 334 and the lower one 336 is relieved abruptly at three ounces, and since the weights can descend only at pressure in vicinity of two ounces, there will be no extended time lag of gradually diminishing pressure differential in the zone where the pistons would be delicately poised for movement in viscosity testing.

With instruments constructed in accordance with this invention, when the flow of fluid through the instrument is stopped, the upper compartment pressure bleeds off through a meter outlet to more or less nothing. This drops the pressure over the weights 346 and 348 also. The pressure control valve piston 386 closes to equalize the lower compartment 336 pressure to the upper compartment 334 pressure within an eight ounce differential as determined by the piston weight and size. At this time the conduit 376 is closed effecting a continuing pressure differential to hold the pistons up. This pressure has no release except slowly by seepage of oil or fluid past the ball valve 382. Since the inlets for each of the fluid control valve sleeve assembly 382 and the piston valve 386 are at a low point in the chamber 336, air is trapped in the spaces above these points.

The oil seepage from chamber 336 ultimately allows the air to expand to the pressure where the ball valve 382 drops in the by-pass valve and then the pistons commence their descent. This dwell period allows the captive, or the standard oil in the compartment 368, time to conform in temperature to the oil in the compartments 334.

It has been observed that with hot engine oil, a difference of 1° F. between the standard oil and the test oil makes on the order of 1 or 2 percent difference in viscosity. With a cold oil, 1° F. makes around 4 or 5 percent difference in viscosity. Thus, to achieve the same meter accuracy, cold oil requires a much closer equalization than does hot. The instrument constructed in accordance with this invention handles this difference automatically since the cold oil, being more viscous, will take more time to seep through the clearance between the valve 382 and the conduit wall 376 and therefore the time before test commencement is longer. Actually, this dwell period varies between 120 seconds for cool oil and 30 seconds for hot oil, approximately. The exact time depends upon other characteristics such as absolute viscosity of the oil being used.

When a cold engine is started, the crank case temperature rises very rapidly, perhaps about 5 or 10° F. per minute. Thus, the standard oil temperature would lag further behind the engine's sump oil during the engine warm-up period. Hence, at this time, it would require more exact equalization due to the greater influence of lingering temperature difference. This could be handled by a dwell of fixed duration long enough to take care of the worst conditions. Most viscosity readings are made on hot engines, however, and adjustment for cold engine conditions could needlessly delay the operator taking a majority of readings.

In the embodiment illustrated in FIG. 26 there is provided modifications of the reservoir tank constructions for both the standard and the test fluids and including a modification of the reservoir tank constructions for both the standard and the test fluids and including a modified arrangement of pressure control between compartments 334 and 336.

When the oil flow from inlet 372 upwardly in the conduit 376 has raised the valve 382, closing outlet 379, the liquid will continue to flow outwardly from the jet tube 381 and passage 369 (FIG. 19) until the lower chamber is filled. When the pressure in the lower chamber 336 exceeds that in the upper chamber 334 by over the amount required to lift the valve piston 457 the piston will rise to maintain the unbalance at that pressure. The piston 457 is slidable in a pressure controlled valve body 458. The arrangement is such that the piston will rise when the compartment 336 pressure is one-half pound per square inch more than the compartment 334 pressure. The piston will uncover a large opening 460 in the conduit 458 and permit flow from the lower compartment 334 to the upper compartment 336. In its upward movement the piston 457 will also uncover an inlet leading through an engine oil reservoir supply conduit 462 which feeds through a conduit 464, which extends through a standard reservoir tank 466 and discharges into an engine reservoir tank 468 (FIG. 28).

The engine reservoir tank 468 is continuously supplied through the conduit 462 with liquid which may overflow through either one of a pair of discharge pipes 470 and 472 which extend outwardly from the top thereof. The piston 457 is provided with a rod 474 at its lower end which rests on an arm of the bracket 431 when it is in its lowermost position.

In accordance with this embodiment (FIGS. 26, 26*a* and 28) the standard tank 466 is also provided with a pair of discharge pipes 476 and 478 extending upwardly at each side thereof. In this embodiment the standard tank 466 is filled with a standard fluid through an inlet 480 which is uncovered by a valve closure member 482 affixed to a rod 484 (FIG. 26*a*). The rod 484 may be moved downwardly against the force of a compression spring 486 by a lever 488 similarly to the previous embodiment illustrated in FIG. 22. The inlet 480 communicates with the cylinder 340 and delivers fluid thereto and into the standard tank 466 through a conduit or orifice 492 (FIG. 28). The fluid fills the standard tank and overflows through pipes 476 or 478. This fluid remains in the tank until it is changed by operating lever 488 in the manner described. Both the engine oil tank 468 and the standard tank 466 are provided with two discharge pipes, one located on each side thereof in order to make sure that when the instrument is tilted at least one of the discharge pipes will be located at the high end and any air which is trapped in the upper portion of the tank will be bled through one of the pipes. Each tank 466 and 468 is provided with a discharge passage 490 and 492 respectively arranged to direct fluid through orifices into test chambers as in the previous embodiments. The passage 492 also functions as a filling conduit.

In FIG. 29 there is indicated another embodiment of standard fluid and test fluid tank construction. The construction is substantially similar to that indicated in FIG. 28 with the exception that the test fluid tank is provided with an opening 509 along the top edge to permit the continuous flow of liquid from the tank 468 around the top of the standard tank 466 in order to insure that the standard fluid is maintained at the same temperature as the test fluid.

When the instrument is tilted one of the weight assemblies 346 or 348 will be at a lower elevation than the other. Hence when a test is run the lower piston must push oil from a lower point and therefore against a greater discharge head. Since the tanks are exactly symmetrical and exactly alike and each full of oil the tilt will increase the positive head of oil above the orifice to the lowermost piston. This amount of increase will be directly proportional to the increase in discharge head or back pressure for that piston and hence the instrument will be automatically corrected for change in level.

The outlet for the meter indicated in the embodiment shown in FIG. 26 is through a tube 494 which extends down into the housing about one inch. Since the air in the meter on first filling it, rises above the oil or the liquid, it will form a pocket at the top of the housing. This air will be compressed so that the oil level may rise above the bottom end of the tube 494, but the pressure in the upper compartment is never great considering the restrictions at the main inlet and the relatively freer outlet from the compartment. The rise in pressure therefore is readily anticipated in the designed dimensions. The outlet tubes on the top of the specimen tanks extend up into the air pocket at the top of the housing. The circulating oil tank 468 spills outwardly through the top discharge pipe 470 and 472 and joins the rest of the oil leaving the meter, the flow being designed to spill over the top of the tanks and not squirt in order to avoid entraining pocket air. The air on the top of the housing holds back the pool of oil away from the outlet tubes of the tanks, preventing contamination of the captive specimen in the specimen tank 466. The arrangement effects identically static pressures on both the fluids in the standard tank 466 and the specimen tank 468.

Since the instrument is extremely sensitive to any inequalities of oil level between the two tanks, any air trapped in either tank and not the other would cause inaccurate readings. In those instances where the standard tank has only one outlet tube and the meter is tilted, the high end of the tank will be higher than the point on the tank where the outlet tube joints and the oil will fill the tank to the level of the outlet and trap a little air in the high corner of the tank. A portion of oil in each tank is drawn into the cylinders at each cycle and air enters through vent pipes 470, 472 and 476, 478. When the pistons rise again, the oil returns to the respective tanks and an amount of oil is lost out of the vents equal to the volume of trapped air. For tank 466 this is especially serious because even if the instrument is thereafter leveled the lost oil is not automatically replaced as it is in the tank 468. (This loss of oil does not occur in the previous embodiment where the collapsible upper chamber is provided above the standard tank.) In the case of the engine liquid, it is subsequently replaced by flow through the conduit 462 during the operation of the engine to which the instrument is connected. Therefore, with the embodiment indicated in FIG. 26 there is included discharge pipes located at each side of the top of each of the reservoir tanks and rounder corners for the tanks, undesirable effects caused by tilting of the instrument will be minimized. The outlet tubes 470, 472, and 476, 478 are made sufficiently long to prevent spillage of liquid from the tanks during normal tilting up to 30° from vertical.

In accordance with the embodiment indicated in FIG. 26 each of the engine reservoir tanks 468 and the standard reservoir tank 466 is substantially identical and is widened at the upper portion to present a wider cross sectional area in the upper portions than at the lower portions thereof. This reduces errors caused by changes in liquid level to a minimum. Thus, if for some reason the liquid in either tank should be depleted and the level changed, the error introduced in the instrument would be less with the greater cross sectional area at the upper portions of the tanks and the liquid level therefore would be reduced a lesser amount. For any errors that still persist compensation can be made in the scale of the instrument.

The enlargement of the upper portion of each tank plays a part in the cycling even when both tanks are filled equally. When the oils being tested are of the same viscosity, both pistons withdraw equal amounts of oil from the tanks and the respective levels of the tanks remain the same during the cycle. But when one oil is thinner than the other the piston associated with the thinner oil withdraws more oil by traveling faster and further. This creates a difference in head pressure in favor of the slower piston and tends to reduce the travel of the pointer. Construction of tanks with the greater volume capacity at the top reduces the distances between the ebb and flood levels and the amount of excess oil withdrawn from either makes proportionally less net difference in the respective tank levels. The lower sections of the tank are made thin to provide high heat transfer surface to volume ratio and hold enough oil to satisfy the orifice requirements.

While the various embodiments shown and described have been directed to equal weight pistons and equal size orifices, no such limitations need necessarily be imposed. Those skilled in the art will readily appreciate that the invention could be practiced with dissimilar orifice diameters and piston weights to give the same relative viscosity information.

While specific embodiments of the invention have been shown and described in detail to illustrate the application of the invention principles, it may be understood that the invention may be embodied otherwise without departing from such principles.

I claim:

1. A viscosity gauge comprising, in combination, a container for a supply of a standard fluid; a container for a supply of a fluid to be tested; separate chambers communicating with the respective containers, each through an orifice, the orifices being of predetermined relative dimensions; means including two bodies of predetermined relative weights and dimensions guided for simultaneous sliding movements in the respective chambers for independently impelling the fluids from the respective containers into the respective chambers; and means disposed simultaneously to arrest said bodies when a predetermined combined movement of the bodies has been executed and responsive to said bodies to reflect the relative flow velocities of said fluids through said orifices up to the movement of such arrest.

2. An oil viscosity gauge adapted for connection as an appurtenance to an engine having an oil pump, said gauge comprising, in combination, a casing through which engine oil is continually transmitted by the pump during operation of the engine, a flexible reference oil container within the casing and maintained submerged in the engine oil so that the reference oil will be always at the same temperature and pressure as the surrounding engine oil, identical flow measuring means for the engine oil and for the reference oil including identical measuring chambers of variable capacity and identical flow resistance passages leading thereto, means automatically effective in response to the shutting off of the oil pressure from the engine to initiate and maintain flow of engine oil through one orifice to the associated measuring chamber and to initiate and maintain flow of reference oil through the other orifice to the other measuring chamber, all under identical pressure conditions, until a predetermined total amount of oil has flowed into the two measuring chambers, the measuring means further including means responsive to the difference in the amount of engine oil and reference oil fed into the respective measuring chambers during the test period to indicate the viscosity of the engine oil relative to the reference oil.

3. An oil viscosity gauge as set forth in claim 26, in which the relative viscosity determining means comprises a balancing lever pivotally mounted to have its opposite arms disposed in the paths of the respective movable members, and lever engaging members carried by the respective movable members in positions to engage and actuate the respective lever arms during the test.

4. An oil viscosity gauge as set forth in claim 26, in which the relative viscosity determining means comprises a balancing lever pivotally mounted to have its opposite arms disposed in the paths of the respective movable members, and lever engaging members carried by the respective movable members in positions to engage and actuate the respective lever arms during the test, the lever engaging members being in the form of nuts which are provided with circular knife edged projections for engaging the lever arm.

5. An oil viscosity gauge as set forth in claim 26, in which the viscosity measuring means comprises a balancing lever pivotally mounted to have its opposite arms disposed in the paths of the respective movable members, and lever engaging members carried by the respective movable members in positions to engage and actuate the respective lever arms during the test, the lever engaging members being in the form of nuts which are provided with circular knife edged projections for engaging the lever arms, the lever arms having channels formed in their upper faces and having serrated top faces bordering the channels, and substantially frictionless, light spring means disposed normally above the channels but yieldable into the channels when a balanced condition is reached to permit the lever engaging members to become interlocked with the serrated faces of the arms for preserving a condition which accurately indicates the result of the test until the gauge is again exposed to the influence of operation of the oil pump.

6. An oil viscosity gauge as set forth in claim 26, in which the relative viscosity determining means comprises a balancing lever pivotally mounted to have its opposite arms disposed in the paths of the respective movable members, and lever engaging members carried by the respective movable members in positions to engage and actuate their respective lever arms during the test, the lever engaging members being in the form of nuts which are provided with circular knife edged projections for engaging the lever arms, the lever arms having channels formed in their upper faces and having serrated top faces bordering the channels, and a light wire spring anchored midway of its length in the channel and having oppositely extending arms which lie normally above the associated lever arms to prevent locking of the lever arms until a balanced condition is reached, and which are yieldable into the channel when a balanced condition of the lever is reached to permit the lever engaging members to become interlocked with the serrated faces of the arms for preserving a reading which accurately indicates the result of the test until the gauge is again exposed to the influence of operation of the oil pump.

7. An oil viscosity gauge as set forth in claim 26, in which the relative viscosity determining means comprises a balancing lever pivotally mounted to have its opposite arms disposed in the paths of the respective movable members, and lever engaging members carried by the respective movable members in position to engage and actuate the respective lever arms during a test, the gauge including means for limiting deviation of the lever to an active range of less than 45° from the horizontal in either direction, in which range either of the lever arms may be engaged by the associated actuating member, the construction and arrangement being such, however, that both lever engaging members are normally maintained at a substantial distance above the active range so that each lever engaging member will have to travel downward during a test period through a substantial lost motion range before entering the active range.

8. An oil viscosity gauge as set forth in claim 26, in which the relative viscosity determining means comprises a balancing lever pivotally mounted to have its opposite arms disposed in the paths of the respective movable members, and lever engaging members carried by the respective movable members in position to engage and actuate the respective lever arms during a test, the gauge including means for limiting deviation of the lever to an active range of less than 45° from the horizontal in either direction, in which range either of the lever arms may be engaged by the associated actuating member, the construction and arrangement being such, however, that both lever engaging members are normally maintained at a substantial distance above the active range so that each lever engaging member will have to travel downward during a test period through a substantial lost motion range before entering the active range, the combined movement of the lever engaging members in the lost motion range being substantially greater than the combined movement of the lever engaging members in the active range during a test period.

9. An oil viscosity gauge adapted for connection as an appurtenance to an engine having an oil pump, said gauge comprising, in combination, an outer casing having inlet and outlet passages through which oil is continually transmitted by the oil pump of the engine so long as the engine is in operation, means within the casing defining upper and lower chambers, means in the casing normally causing the engine oil which enters the casing to pass from the lower chamber into the upper chamber and, in so doing, to suffer a substantial pressure drop, a freely flexible, reference oil sac in the upper chamber constantly exposed to the temperature and pressure of the engine oil which passes through the chamber, a pair of vertically extending cylinders disposed between the upper and lower chambers, pistons disposed for vertical travel in the respective cylinders, flow resistance fittings respectively connecting one cylinder with the upper chamber and the other cylinder with the interior of the sac, the pistons being exposed at their lower ends to the engine oil pressure in the lower chamber, and being held up by the difference of oil pressure in the upper and lower chambers so long as the engine is running, but being automatically freed to drop simultaneously upon interruption of the engine oil pressure, thereby to produce a test of relative viscosity, means in the lower chamber for measuring the difference of downward travel of the pistons during the test period, and indicating means responsive to said measuring means for indicating the viscosity of the engine oil relative to the reference oil.

10. An oil viscosity gauge as set forth in claim 9, in which a positively acting discharge valve is provided normally preventing loss of oil from the sac, the valve being manually operable to an open position when the sac oil is to be replaced by a fresh sample, and means for mechanically squeezing the sac while the valve is open to limit the extent to which the sac may be filled, thereby reserving sufficient surplus capacity in the sac to accommodate oil driven into the sac from the associated cylinder after the valve is closed and to accommodate air entrapped in the sac without straining the free capacity of the sac, the sac being provided with a fixed baffle plate located near the bottom of the sac and extending from the end at which oil enters and leaves the sac, through a substantial part of distance to the opposite end of the sac, for compelling oil to enter the squeezed sac along a confined path beneath the baffle plate and to leave the squeezed sac along a confined path above the baffle plate.

11. An oil viscosity gauge as set forth in claim 9, in which a positively acting discharge valve is provided normally preventing loss of oil from the sac, the valve being manually operable to an open position when the sac oil is to be replaced by a fresh sample, and means for mechanically squeezing the sac while the valve is open to limit the extent to which the sac may be filled, thereby reserving sufficient surplus capacity in the sac to accommodate oil driven into the sac from the associated cylinder after the valve is closed and to accommodate air entrapped in the sac without straining the free capacity of the sac, the gauge further including a fixed raised plate for supporting the sac in opposition to the squeezing means, said plate extending over one of the cylinder connected flow resistance fittings and being spaced therefrom to prevent obstruction of flow toward or into the fitting by the sac.

12. An oil viscosity gauge as set forth in claim 9, which further includes positively acting admission and discharge valves for the sac, and a squeezing means for the sac, and in which a common operating means is provided which is connected simultaneously to operate the valves to open position and the squeezing means to a squeezing condition when the reference oil in the sac is to be replaced by a fresh sample, and simultaneously to return the valves to closed positions and the squeezing means to a non-squeezing condition when the replacement operation is completed, the squeezing means serving to limit the extent to which the sac may be filled and thereby to reserve sufficient surplus capacity in the sac to accommodate oil driven up into the sac from the associated cylinder and to accommodate air entrapped in the sac without straining the free capacity of the sac.

13. An oil viscosity gauge as set forth in claim 9, which further includes positively acting admission and discharge valves for the sac, and a squeezing means for the sac, and in which a common operating means is provided which is connected simultaneously to operate the valves to open position and the squeezing means to a squeezing condition when the reference oil in the sac is to be replaced by a fresh sample, and simultaneously to return the valves to closed positions and the squeezing means to a non-squeezing condition when the replacement operation is completed, the squeezing means serving to limit the extent to which the sac may be filled and thereby to reserve sufficient surplus capacity in the sac to accommodate oil driven up into the sac from the associated cylinder and to accommodate air entrapped in the sac without straining the free capacity of the sac, the common operating means including a handle operable between valve closing and valve opening positions and having a cam portion formed automatically to retain the handle in valve opening position when operated to that position.

14. A relative viscosity gauge comprising a casing having an upper portion and a lower portion, a container for a supply of standard liquid within said upper portion, a container for a supply of liquid to be tested within said upper portion, two separate chambers, restricted passage means connecting each container with a respective chamber, weighted bodies in each of said chambers guided for sliding movement therein when impelling liquid from the respective containers, means for measuring the relative movement of said bodies over a predetermined range of movement as an indication of viscosity of the liquid to be tested relative to the standard liquid, means for connecting the lower portion of said gauge to a pressurized source of liquid to be tested, first valve means between said upper portion and said lower portion for establishing a relatively large pressure differential therebetween to thereby position said weighted bodies toward said upper portion in a location for initiating a viscosity test, and second valve means responsive to the pressure differential between said upper portion and said lower portion for abruptly equalizing the pressure differential therebetween at a predetermined level as the large pressure differential established by said first valve means decays in magnitude upon removal of the effect of the pressurized source of liquid to be tested from the lower portion.

15. An oil viscosity gauge as set forth in claim 9, in which a positively acting discharge valve normally prevents loss of oil from the sac, the valve being manually operable to an open position when the sac oil is replaced by a fresh sample, and means for mechanically squeezing the sac while the valve is open to limit the extent to which the sac may be filled, thereby reserving sufficient surplus capacity in the sac to accommodate oil driven into the sac from the associated cylinder after the valve is closed and to accommodate air entrapped in the sac without straining the free capacity of the sac.

16. An oil viscosity gauge as set forth in claim 9, in which the means for causing the engine oil to pass from the lower chamber to the upper chamber comprises means forming a comparatively large passage with an associated pressure reducing valve, means forming at least one fine passage which is constantly open, and means forming an intermediate passage with an associated oil controlled check valve, the large passage being adapted to pass the oil in large quantity but subject to a substantial pressure drop during engine operation but being continuously held closed by the associated pressure reducing valve when the engine is idle, and the intermediate passage being held closed by the difference of oil pressures in the upper and lower chambers during engine operation but arranged to be opened automatically when the engine stops, thereby to provide ample flow area for transferring oil without substantial resistance from the lower chamber to the upper chamber as the pistons slowly descend during a test period.

17. A viscosity gauge as set forth in claim 9, in which upstanding piston guiding rods for the respective pistons are provided in the lower chamber, the pistons having bores for receiving the rods and tubes forming downward prolongations of such bores.

18. A viscosity gauge as set forth in claim 9, in which downwardly extending piston guiding rods are disposed in the respective cylinders, the pistons having bores for receiving the rods, which bores are closed at their lower ends, the construction and arrangement being such that a dash-pot resistance is provided in each cylinder opposing descent of the piston which operates therein, and that the dash-pot resistance in each instance diminishes progressively as the piston descends.

19. A viscosity gauge adapted for connection to a liquid pressure line, comprising, in combination, viscosity responsive means including separate reference liquid and sample liquid container means, at least two movable members, means effective when said gauge is connected to said pressure line to constantly urge said members to a testing position, force means for causing said movable members to be forced in a direction contrary to said urging, means for cutting off the pressure in said pressure line connection to render said urging means ineffective and to cause said force means to become effective to cause testing movement of both members to occur, means causing the testing movement of the members to be opposed respectively by the viscosity of a sample liquid in said sample liquid container means and the viscosity of a reference liquid in said reference liquid container means and indicator means responsive to the relative positions of said movable members.

20. A viscosity gauge comprising, a container for a supply of standard liquid, a container for a supply of liquid to be tested, two separate substantially vertical chambers, identical restricted passage means connecting each container with a respective chamber, identical weighted bodies in each of said chambers guided for sliding movement therein when impelling liquid from the respective containers, means for connecting said gauge to a source of fluid under pressure, means for positioning said weighted bodies in a location for initiating a viscosity test in response to said liquid pressure and means for indicating the relative positions of said weighted bodies after they have moved a predetermined combined distance.

21. A viscosity gauge according to claim 22 including means to disconnect said gauge from said liquid pressure source and to initiate a viscosity test thereby.

22. A viscosity gauge comprising, a container for a supply of standard liquid, a container for a supply of liquid to be tested, two separate substantially vertical chambers, restricted passage means connecting each container with a respective chamber, weighted bodies in each of said chambers guided for sliding movement therein when impelling liquid from the respective containers, means for measuring the relative movement of said bodies over a predetermined range of movement as an indication of viscosity of the impelling liquid, means for connecting said gauge to a source of fluid under pressure and means actuated by said fluid pressure for positioning said weighted bodies in a location for initiating a viscosity test.

23. A viscosity gauge for connection to a liquid pressure line comprising, a casing connected in said pressure line, and having an interior upper and lower portion, means connecting said upper and lower portions and said liquid pressure line producing a lower liquid pressure in the upper portion than the lower portion, means defining a test chamber located in said upper portion, means defining first and second weighted body chambers in said casing, restricted passage means connecting said test chamber to said first weighted body chamber and connecting said second weighted body chamber to the upper portion of said casing, weighted bodies guided for reciprocable movement in said first and second body chambers, the lower portions thereof being acted on by the pressure in the lower portion of said casing to hold them in an upper viscosity test initiating position, viscosity indicating means responsive to relative movement of said weighted bodies, and means to abruptly remove the pressure differential between the upper portion and lower portion to cause said weighted bodies to move downwardly an amount in proportion to the viscosity of its associated impelled liquid and to cause said viscosity indicating means to indicate the relative viscosities of the test liquid in the test chamber and the standard liquid in the surrounding casing.

24. A viscosity gauge adapted for connection to a liquid under pressure, said gauge comprising, in combination, a casing connected to said liquid under pressure and through which liquid is continuously circulated, a flexible reference liquid container within the casing to maintain the reference liquid at substantially the same temperature and pressure as the surrounding liquid, identical flow measuring means for the liquid and for the reference liquid including identical flow resistance passages leading thereto, means automatically effective in response to the shutting off of fluid pressure to initiate and maintain flow of liquid through one orifice to the associated measuring chamber and to initiate and maintain flow of reference liquid through the other orifice to the other measuring chamber, all under identical pressure conditions, until a predetermined total amount of liquid has flowed into the measuring chambers, the measuring means further including means responsive to the difference in the amount of liquid and reference liquid fed into their respective measuring chambers during the test period to indicate the viscosity of the liquid relative to the reference liquid.

25. A liquid viscosity gauge adapted for connection to a liquid pressure source comprising, in combination, an outer casing having inlet and outlet passages through which liquid is continuously transmitted by the liquid pressure source, means within the casing defining upper and lower chambers, means in the casing normally causing the liquid which enters the casing to pass from the lower chamber into the upper chamber, and, in so doing, to suffer a substantial pressure drop, a freely flexible reference liquid sac in the upper chamber substantially exposed to the temperature and pressure of the liquid which passes through the chamber, a pair of identical vertically extending cylinders disposed between the upper and lower chambers, identical pistons disposed for vertical travel in the respective cylinders, identical flow resistance fittings respectively connecting one cylinder with the upper chamber and the other cylinder with the interior of the sac, the pistons being exposed at their lower ends to the liquid pressure in the lower chamber, and being held up by the difference in liquid pressure in the upper and lower chambers as long as the liquid pressure source is connected to said casing, but being automatically free to drop simultaneously on the disconnecting of said casing from said liquid pressure source, thereby to produce a test of relative viscosities, means in the lower chamber for measuring the difference of downward travel of the pistons during this test period, and indicating means responsive to said measuring means for indicating the viscosity of the liquid relative to the reference liquid.

26. An oil viscosity gauge adapted for connection as an appurtenance to an engine having an oil pump comprising, in combination, a gauge casing through which engine oil is normally circulated by the oil pump, separate reference oil and engine oil container means for maintaining samples of an engine oil and a reference oil within the casing segregated from one another but at the same pressure and the same temperature for testing purposes, viscosity measuring means comprising separate test chamber members each including a traveling member, individual passage means connected to said reference oil and engine oil container means and to a respective enclosed member, means for maintaining the side of each of said traveling members which is remote from said container means at a higher pressure than the pressure of said container means when said instrument is under the influence of said oil pump whereby the traveling members are maintained by the oil pump pressure in position for starting of a test, means for cutting off the influence of the oil pump so that the previously unbalanced pressures at opposite sides of the traveling members become equalized, said traveling members being movable upon shutting off of the influence of said oil pump in proportion to the rate of flow of engine oil and reference oil from said engine oil and reference oil container means to the respective test chamber members and being in proportion to the viscosity of the oils compared, and means jointly responsive to said movable members for determining the viscosity of the engine oil relative to the reference oil.

27. An oil viscosity gauge as set forth in claim 26, which further includes manually operable means for discharging the reference oil supply from the reference oil container means and for placing said reference oil container means in communication with the engine oil under pump pressure, so that the pump will act to replace the reference oil with a fresh reference sample from the engine oil when the engine oil has been freshly changed, said manually operable means being movable back to its normal position to terminate the replacement operation at the will of the operator.

28. A viscosity gauge comprising a casing, means to divide said casing into an upper compartment and a lower compartment, a container for a supply of standard fluid within said upper compartment, separate measuring chambers disposed intermediate said upper and lower compartments, a first of said measuring chambers communicating with said upper compartment, a second of said measuring chambers communicating with said standard fluid container, each through a restricted passage, means including a weight in each chamber for independently drawing the fluid into respective chambers, means for indicating the relative position of the weight in one chamber with respect to the other weight in the other chamber, means to connect said gauge to a fluid pressure source, means to direct fluid through the upper and lower compartments of said gauge while maintaining a pressure difference between said compartments including means to eliminate said pressure difference of said upper and lower compartments upon the disconnection of said fluid pressure source.

29. A viscosity gauge according to claim 28 wherein said fluid directing means includes a passage connecting said upper and lower compartments, said passage having, a ball check movable in said passage between the bottom thereof and said narrowed portion under fluid pressure whereby to close off said passage when it is held against said narrowed portion by fluid pressure.

30. A viscosity gauge according to claim 28 wherein said fluid directing means includes a piston valve located between said upper and lower compartments permitting fluid communication therebetween when the pressure in the lower compartment is great enough to lift said valve. .

31. An apparatus according to claim 28 wherein said fluid directing means includes flow control means arranged between said upper and lower compartments effective to permit a metered flow through said compartments while maintaining a pressure difference therebetween when the instrument is connected to a fluid pressure source, and effective to relieve the pressure difference between said compartments instantaneously after a short interval from the disconnection from said fluid pressure source.

32. A viscosity gauge according to claim 30 wherein said passage includes an inlet at the lower portion thereof, a discharge passage directed into the lower compartment and located slightly above said inlet, and said ball check includes a rounded top portion and an elongated body portion which closes said discharge passage but comes to rest above said inlet when at rest in the bottom of said passage.

33. A viscosity gauge comprising a casing, means to divide said casing into an upper compartment and a lower compartment, a container for a supply of standard fluid within said upper compartment, separate measuring chambers disposed between said upper and lower compartments, a first of said measuring chambers communicating with said upper compartment, a second of said measuring chambers communicating with said standard fluid container, each through a restricted passage, means including a weight in each chamber for independently drawing the fluids into respective chambers, means responsive to the difference in amount of fluid fed into the respective measuring chambers to indicate the difference of position between the weights in each chamber, means to connect said gauge to a fluid pressure source, means to direct said fluid to the upper and lower compartments of said gauge when connected to said fluid pressure source, while maintaining a pressure difference between said compartments, including means to instantaneously eliminate said pressure difference after the disconnection of said fluid pressure source.

34. A viscosity gauge according to claim 33 wherein said means responsive to the difference in amount of fluid fed into the respective measuring chambers includes a balancing coil spring lever pivotally mounted to present an arm in the path of each weight, said weights having their lower ends shaped to engage said spring arm upon descent whereby the first of said weights to strike said lever arm rotates said spring lever and continues to do so until the other weight contacts the opposite arm and holds said spring lever in a relative viscosity indicating position.

35. A viscosity gauge according to claim 33 wherein said means responsive to the difference in amount of fluid fed into the respective measuring chambers includes a balancing lever pivotally mounted to present an arm in the path of each weight, said weights being arranged to engage said lever arms upon descent, said lever arms being biased upwardly but movable downwardly against said biasing and including a central pointed member depending therebelow, a resilient member arranged beneath said depending member, said lever arm being rotatable upon contact by the first of said weights and being movable downwardly against the biasing of said spring upon contact by both of said weights to direct said depending member into said resilient member and hold said balancing arm in a viscosity indicating position.

36. A combination according to claim 35 wherein said lever arm is mounted at the end of a spring.

37. A viscosity gauge according to claim 33 including an expansible chamber connected to said standard fluid chamber, and means to compress said expansible chamber to expel fluid from said standard chamber.

38. A viscosity gauge comprising, a container for a supply of standard fluid, a container for a supply of fluid to be tested, two identical separate chambers, identical restricted means connecting each container to its respective chamber, identical weighted bodies in each of said chambers guided for sliding movement therein when impelling fluid from the respective containers, means for connecting the gauge to a source of fluid under pressure, means for permitting a small quantity of fluid to circulate through said gauge while maintaining the fluid pressure below said weighted bodies greater than the pressure thereabove, to hold the bodies in an upward viscosity test initiating position, said means being effective upon said disconnection of said fluid pressure source to eliminate the pressure difference between the bottoms and the tops of said weighted bodies, and means responsive to the difference in amount of fluid fed into the respective chambers to indicate the relative viscosity of the fluids.

39. A viscosity gauge according to claim 38 wherein said restricted passage means includes a cylindrical conduit having port openings extending along their lengths, and said weighted bodies are mounted for reciprocation on said cylindrical conduits and are effective to open said ports gradually upon descent to afford greater communication between said containers and said chambers as the weighted bodies are falling in a viscosity test.

40. A viscosity gauge according to claim 38 wherein said means responsive to the difference in amount of fluid fed into the respective chambers to indicate the relative viscosity of the fluids includes a balancing coil spring lever pivotally mounted to present an arm in the path of each weighted body, said weighted bodies having their lower ends shaped to engage said spring arm upon descent whereby the first of the weights to strike said spring arm effects its rotation until the other weighted body contacts the opposite arm and holds the lever in a relative viscosity indicating position.

41. A viscosity gauge according to claim 38 wherein said pressure maintaining means includes a flow control valve connecting the interior of the instrument above and below said weighted bodies, and means to substantially close said flow valve when low velocity head pressures exist therein.

42. A viscosity gauge according to claim 38 wherein said container for the standard fluid and the container for the test fluid are identical and each is provided with upper portions of greater cross sectional area than the lower portions thereof.

43. A viscosity gauge according to claim 42 wherein said containers are each provided with elongated combination overflow and vent pipes in the vicinity of each upper corner thereof.

44. A viscosity gauge according to claim 41 wherein said means for maintaining the fluid pressure below the weighted bodies greater than the pressure thereabove includes a piston valve located between said upper and lower compartments permitting fluid communication therebetween when the pressure in the lower compartment is great enough to lift said valve, and passage means connecting said piston valve and said container for the fluid being tested.

45. A viscosity gauge comprising a casing, means to divide said casing into an upper compartment and a lower compartment, a first container for a supply of standard fluid, a second container for a supply of circulating fluid each container located within said upper compartment and having a lower portion of relatively smaller cross sectional area than its upper portion, separate measuring chambers disposed intermediate said upper and lower compartments, a first of said measuring chambers communicating with said second liquid container, a second of said measuring chambers communicating with said first container, each through a restricted passage, means including a weight in each chamber for independently drawing the fluid into their respective chambers, means for determining the relative position of said weights in said chambers, means to connect said gauge to a pressure source, means to direct fluid through the upper and lower compartments of said gauge while maintaining a pressure difference between said compartments including means to instantaneously eliminate said pressure difference of said upper and lower compartments upon the disconnection of said fluid pressure source.

46. A viscosity gauge according to claim 44 wherein each of said containers is provided with a separate outlet on each side of the top thereof.

47. A viscosity gauge comprising a casing, means to divide said casing into an upper compartment and a lower compartment, a container for a supply of standard fluid within said upper compartment, separate measuring chambers disposed between said upper and lower compartments, a first of said measuring chambers communicating with said upper compartment, a second of said measuring chambers communicating with said standard fluid container, each through a restricted passage, means including a weight in each of said chambers for independently drawing the fluids into their respective chambers, means responsive to the difference in amount of fluid fed into the respective measuring chambers to indicate the relative position of the weight in one chamber with respect to the position of the weight in the other chamber, means to connect said gauge to a fluid pressure source, means to direct said fluid to the upper and lower compartments of said gauge when connected to a fluid pressure source while maintaining a pressure difference between said compartments, including means to instantaneously eliminate said pressure difference after the disconnection of said fluid pressure source.

48. A viscosity gauge according to claim 19 wherein said indicator means includes a balancing lever pivotally mounted to present an arm in the path of each of said movable members, said movable members being arranged to engage said lever arms upon descent, said lever arms being biased upwardly but movable downwardly against said biasing and including a central pointed member depending therefrom, a resilient member arranged beneath said depending member, said lever arm being rotatable upon contact by the first of said weights and being movable downwardly against the biasing of said spring upon contact by both of said weights to direct said depending member into said resilient member and hold said balancing lever in a viscosity indicating position.

49. A viscosity meter for comparing the viscosity of a pressurized liquid with a standard liquid comprising means to contain a sample of standard liquid, means to contain a sample of test liquid whose viscosity is to be compared with said standard liquid, means to maintain the liquids in each of said means at substantially the same temperatures, means positionally responsive to the difference in viscosity between the standard liquid and the viscosity of the test liquid and means utilizing the pressure of the liquid to be tested to hold said last mentioned means inactive.

References Cited in the file of this patent

UNITED STATES PATENTS

| | | |
|---|---|---|
| 1,529,811 | Priest | Mar. 17, 1925 |
| 1,874,015 | King | Aug. 30, 1932 |
| 1,972,736 | Haug | Sept. 4, 1934 |
| 2,503,660 | Exline et al. | Apr. 11, 1950 |